(12) United States Patent
Condie et al.

(10) Patent No.: US 11,306,474 B1
(45) Date of Patent: Apr. 19, 2022

(54) LIFTING MECHANISM FOR EXPANDABLE SHELTER

(71) Applicant: Berg Companies, Inc., Spokane Valley, WA (US)

(72) Inventors: Brent Condie, Worley, ID (US); Paul Gorka, Spokane, WA (US)

(73) Assignee: Berg Companies, Inc., Spokane, WA (US)

( * ) Notice: Subject to any disclaimer, the term of this patent is extended or adjusted under 35 U.S.C. 154(b) by 0 days.

(21) Appl. No.: 16/540,362

(22) Filed: Aug. 14, 2019

Related U.S. Application Data

(60) Provisional application No. 62/719,033, filed on Aug. 16, 2018.

(51) Int. Cl.
| | |
|---|---|
| *E04B 1/343* | (2006.01) |
| *E04B 1/344* | (2006.01) |
| *B66F 11/00* | (2006.01) |
| *E04H 1/12* | (2006.01) |

(52) U.S. Cl.
CPC .......... *E04B 1/34336* (2013.01); *B66F 11/00* (2013.01); *E04B 1/3442* (2013.01); *E04H 1/1205* (2013.01); *E04B 2001/34389* (2013.01); *E04B 2001/34394* (2013.01)

(58) Field of Classification Search
CPC ........ B60P 3/34; E04B 1/3444; E04B 1/3442; E04B 1/34305; E04B 1/3431; E04B 2001/34394; E04H 2001/1283; E04H 12/182

See application file for complete search history.

(56) References Cited

U.S. PATENT DOCUMENTS

| | | | | |
|---|---|---|---|---|
| 3,813,812 A | * | 6/1974 | Barlow | A63H 18/12 463/63 |
| 4,784,527 A | * | 11/1988 | Hunter | E21B 43/017 405/207 |
| 6,227,397 B1 | * | 5/2001 | Kim | B65D 88/005 220/1.5 |
| 6,345,471 B1 | * | 2/2002 | Gyllenhammar | E04B 1/3444 296/169 |
| 7,828,367 B2 | * | 11/2010 | Hickam | B60P 3/34 296/156 |
| 8,166,715 B2 | * | 5/2012 | De Azambuja | E04B 1/3442 52/79.5 |
| 9,080,326 B2 | * | 7/2015 | Johnson | B60P 3/341 |
| 9,121,617 B2 | * | 9/2015 | Condie | F24F 1/02 |
| 9,580,236 B1 | * | 2/2017 | Skeid | B65D 19/08 |
| 11,028,576 B1 | * | 6/2021 | Stecker, Sr. | B66F 3/08 |
| 2016/0108636 A1 | * | 4/2016 | Carlinsky | E02D 35/005 52/126.6 |
| 2019/0148819 A1 | * | 5/2019 | Dominguez | H01Q 1/246 455/562.1 |
| 2019/0345730 A1 | * | 11/2019 | Tafuro | E04B 1/34305 |

* cited by examiner

*Primary Examiner* — Babajide A Demuren
*Assistant Examiner* — Daniel J Kenny
(74) *Attorney, Agent, or Firm* — Fay Sharpe LLP

(57) ABSTRACT

An enclosure including an upper frame, a lower frame, and a lift mechanism operably coupling the upper frame and the lower frame together. The lift mechanism includes first drive shafts and a second drive shaft operably coupling the first drive shafts for operation in unison, and an input operably coupled to at least one of the first drive shafts or the second drive shaft. The lift mechanism transitions the enclosure between a stowed state and a deployed state during a movement of the actuator.

17 Claims, 21 Drawing Sheets

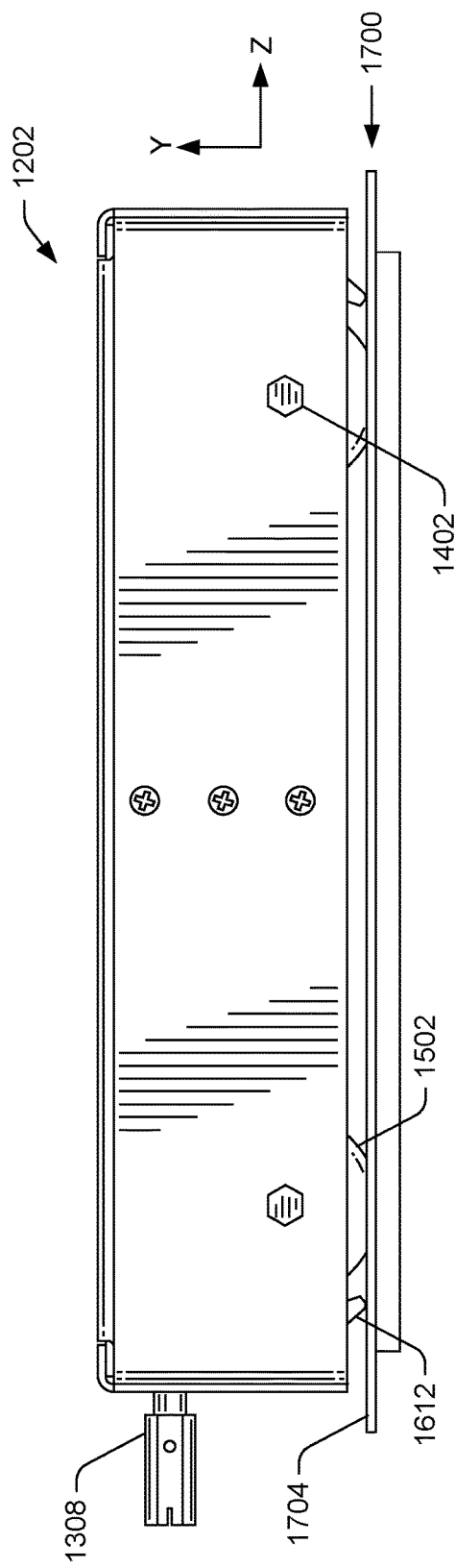
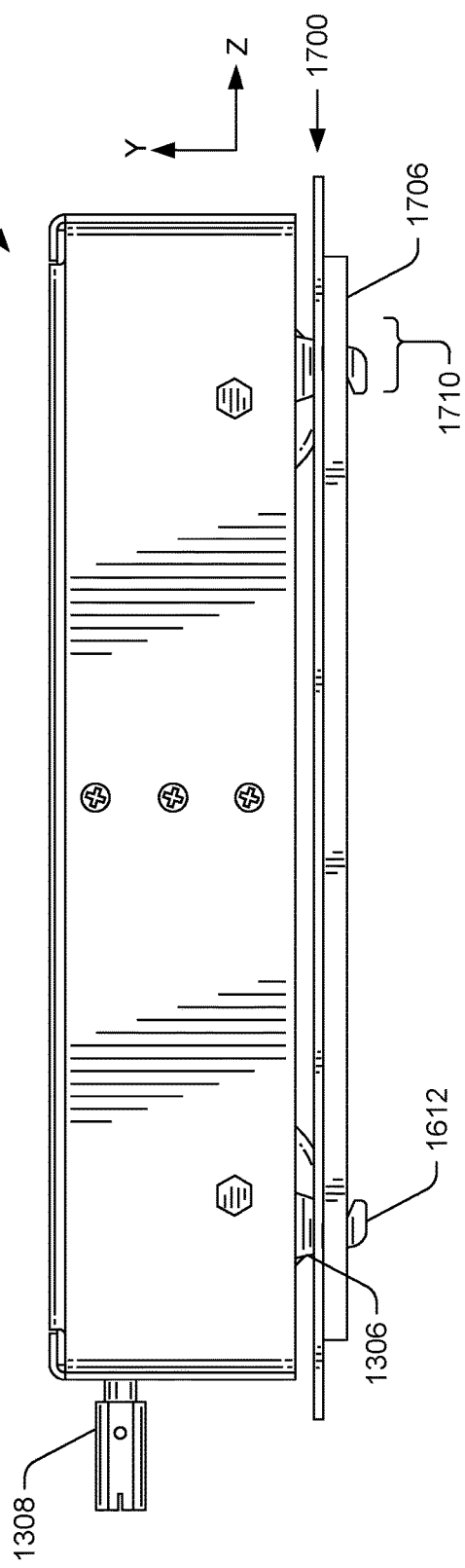
FIG. 19A
FIG. 19B

LIFTING MECHANISM FOR EXPANDABLE SHELTER

CROSS REFERENCE TO RELATED APPLICATIONS

This application claims priority to U.S. Provisional Patent Application No. 62/719,033, filed Aug. 16, 2018, which is incorporated herein by reference.

BACKGROUND

Expandable shelters have been developed for transportation to remote sites where they are then set-up for use. For instance, expandable shelters may be used as housing, barracks, field hospitals, mess halls, kitchens, relief shelters, communication centers, laboratories, and so forth. When deployed, the expandable shelter may expand to create a significantly larger operating footprint. During both transportation and when deployed, however, the size of the expandable shelter is often significant. For instance, the size of the expandable shelter may impact an ease of transportation. Additionally, the rate at which the expandable shelters are configured to transition between stowed and deployed states is often important.

To accommodate for a range of different environments and uses, expandable shelters may include heating ventilation and air conditioning (HVAC) equipment, appliances such as ovens and refrigerators, or other furnishings such as beds, desks, and countertops. However, making the equipment, appliances, or furnishings configurable between stowed and deployed states may increase the footprint of the expandable shelter, sacrifice a compactness of the expandable shelter, create challenges in securing items for transport, and/or may add to manual labor involved in stowing and deploying the expandable shelter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 19A is a side view of an example carrier engaged with an example track, showing the carrier in an unclamped state.

FIG. 19B is a side view of an example carrier engaged with an example track, showing the carrier in a clamped state.

DETAILED DESCRIPTION

Figure 1A:
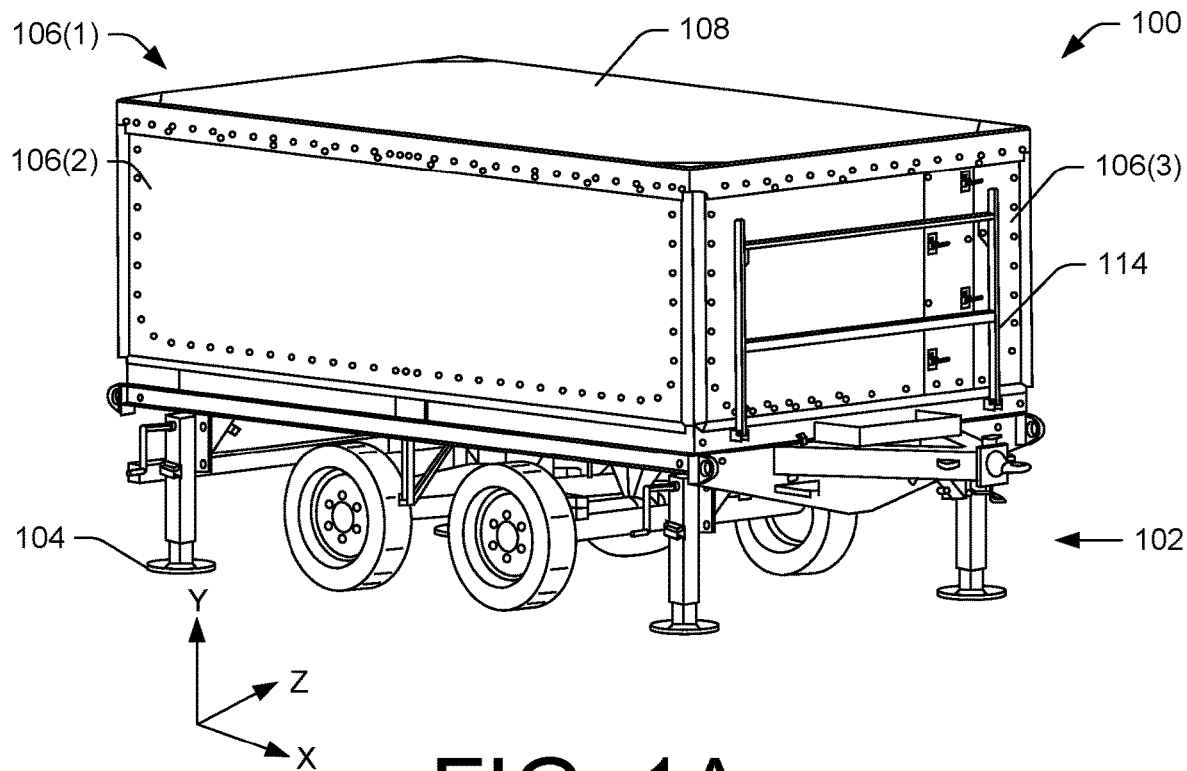
FIG. 1A is a perspective view of an example expandable shelter, showing the example expandable shelter in a stowed state.

As discussed above, existing expandable shelters, or other moveable-type shelters, may lack efficient mechanisms to transition between stowed and deployed states. For instance, portions of the expandable shelter, such as walls, ceilings, and/or floors may not easily deploy and conversely, may not easily collapse when stowing the expandable shelter. Additionally, challenges may arise in safely securing appliances and other objects within the expandable shelter. These appliances and other objects may require large amounts of manual labor to secure, and/or mounts used to secure the appliance may be cumbersome. However, the amount of time spent tending to the intricacies of stowing and deploying the expandable shelter detracts from its utility. As such, the speed and simplicity of stowing and deploying the expandable shelter may be a highly valued feature. Furthermore, existing expandable shelters that include capabilities to easily transition between stowed and deployed states may sacrifice a compact footprint. For instance, walls of the expandable shelter that deploy, or mounts that secure appliances, may be bulky. In turn, as expandable shelter become less compact, or as footprints of expandable shelters increase, the expandable shelter may not be easily transported.

In light of the above, this application describes compact, safe, and efficient mechanisms configured to transition an expandable shelter between a collapsed, retracted, loaded, or stowed state, such as when the expandable shelter is transported, and an expanded, exploded, loaded, or deployed state, such as when the expandable shelter is set-up for use. Compared to existing shelters, the expandable shelter according to this application may easily transition between stowed and deployed states, may safely secure appliances or other during stowed and deployed states, may require minimal manual labor when stowing and deploying, and may reduce stowing and deploying times.

In some instances, the expandable shelter according to this application may be integrated with, combined for use with, and/or coupled to a trailer. The expandable shelter may couple to the trailer and the trailer may transport the expandable shelter to a remote site where the expandable shelter is deployed for use. The trailer may include common features that permit transport, such as brakes, frames, wheels, towing mechanisms (e.g., tongue), and so forth. However, although this application discusses the expandable shelter in use with a trailer, features of the expandable shelter may be usable in other designs as well, with or without a trailer.

The expandable shelter may include frames integrated with or coupled to the trailer. The frames may transition the expandable shelter between stowed and deployed states through an actuation of one or more lifting mechanisms. For instance, the expandable shelter may include an upper frame and a lower frame that operably engage with one another. Through the actuation of the lifting mechanisms, the frames may extend and transition the expandable shelter from the stowed state to the deployed state (or vice versa depending on the actuation). Compared to the stowed state, in the deployed state, an operational footprint and/or volume of the expandable shelter may increase.

Portions of the upper frame and the lower frame may fold, contract, telescope, or collapse within one another to reduce the operational footprint and/or volume of the expandable shelter in the stowed state. For instance, in the stowed state, posts of the upper frame may be disposed over posts of the lower frame. In transitioning the expandable shelter to the deployed state, the posts of the upper frame may slide over an external surface of the posts of the lower frame, raising the upper frame from the lower frame. In this sense, the posts of the upper frame and the posts of the lower frame may act as telescopic system that contract within one another in the stowed state and expand apart in the deployed state.

In some instances, the one or more lifting mechanisms may include motors, gear boxes, gear drives, shafts, jacks, hydraulic pumps, air compressors, manifolds, conduit lines, hydraulic and/or pneumatic cylinders, and couplers that are usable to transition the expandable shelter between stowed and deployed states. In some instances, the one or more lifting mechanisms may include screw jack assemblies (alternatively referred to as a "jackscrews"). The jack screw assemblies may lift and lower portions of the frames in unison (e.g., synchronously) during the deployment and stowing, respectively, of the expandable shelter. The gear boxes, couplers, and shafts may interconnect features of the expandable shelter, such as jack screw assemblies. In some instances, the one or more lifting mechanisms may be disposed at corners, sides, or intersections between the upper frame and the lower frame, and/or may be disposed within one or more of the upper frame and the lower frame, such as within posts of the upper frame. During deployment of the expandable shelter, the one or more lifting mechanisms may balance and suspend loads of the expandable shelter. In doing so, the expandable shelter may deploy at a constant, controlled rate.

To illustrate the deployment of the expandable shelter, vertical shafts may be disposed within the posts of the upper frame and/or posts of the lower frame, while side drive shafts may be disposed in framework of the upper frame and/or the lower frame. The side drive shafts may couple to the vertical shafts through one or more gear boxes that transfer a rotational movement of the side drive shafts to the vertical shafts. Through a rotational movement of the vertical shafts, the upper frame may lift from the lower frame and transition the expandable to the deployed state. Conversely, a rotation of the vertical shaft in an opposite direction may lower the upper frame and transition the expandable shelter to the stowed state.

The interconnection between the gear boxes and shafts may permit the expandable shelter to deploy and stow through operation of a single lifting mechanism. That is, rather than individually operating the one or more lifting mechanisms on the expandable shelter, for instance, linkages between the gear boxes and shafts permit the one or more lifting mechanisms to function as a single unit and lift the expandable shelter. For instance, the one or more lifting mechanisms may be manually operated, such as through rotating a handle coupled to the gear boxes, or may be electrically operated through motors and instead of manually rotating each jack screw with the handle, the linkages between the one or more lifting mechanisms allows the rotational movement to transfer to all vertical shafts, thereby stowing or deploying the expandable shelter. In some examples, the lifting mechanism may be actuated from a single lifting point. In some examples, the lifting mechanism may include multiple alternate lifting points, any one of which may be used to expand or contract the vertical shafts in unison. In the illustrated examples, the lifting mechanism is described as a series of jack screws. However, in some examples the lifting mechanism may additionally or alternatively include other actuators such as hydraulic cylinders, pneumatic cylinders, linear actuators, or any combination thereof that operate in unison to deploy and stow the expandable shelter. That is, linear actuators, for instance, may include jack screws, hydraulic/pneumatic cylinders, and so forth that operate to deploy and stow the expandable shelter.

The one or more lifting mechanisms may maintain their position when the expandable shelter is deployed, stowed, or between stowed and deployed states. For instance, the expandable shelter may expand to less than a fully designed deployed state. At any position along the deployment of the expandable shelter, the one or more lifting mechanisms are designed to support upper frame, for instance, without the expandable shelter collapsing. Such design may allow the expandable shelter to deploy or stow in multiple stages. For instance, during a deployment of the expandable shelter, cables, wires, chords, supply lines (e.g., gas, water, electric, etc.), and so forth may need to be coupled to appliances or routed within the expandable shelter.

In the deployed state, the operational footprint and/or the volume of the expandable shelter may increase through panels unfolding from the frames. For instance, the lower frame may include floor panels that unfold from the lower frame in the deployed state and the upper frame may include ceiling panels that unfold from the upper frame in the deployed state. The expandable shelter may include brackets, mounts, or braces that secure the floor panels and/or the ceiling panels in the deployed state. For instance, the floor panels may include braces that prop, support, or brace against portions of the trailer to support loads experienced by the floor panels. In some examples, the floor panels and/or the ceiling panels may fold into the frame assembly. In some instances, the floor panels and the ceiling panels may be configured to fold within a perimeter of the trailer.

To enclose an interior of the expandable shelter in the deployed state, an exterior canvas or wall may couple to the ceiling panels, the floor panels, the frames, or other portions of the expandable shelter. The exterior wall may seal the interior of the expandable shelter from water, debris, and/or may thermally insulate the interior of the expandable shelter. In addition, the exterior wall may seal the interior to minimize light or sound escaping. In some instances, the exterior wall may couple to the ceiling panels and the floor panels through a combination of straps (e.g., rope, chord, cable, etc.), hangers, tie-downs (e.g., ratchet, cam-buckle, etc.) and a system of channels (e.g., U-channel, C-Channel, etc.), and fasteners (e.g., bead, piping, slides, inserts, boltrope, etc.). For instance, a top of the exterior wall may feed through a channel on the ceiling panels. When the expandable shelter includes more than one ceiling panel, channels may be disposed on respective ceiling panels. In such instances, the channels may align and the exterior wall may continuously extend between channels on the ceiling panels. A bottom of the exterior wall may couple to the floor panels of the expandable shelter through coupling straps on the exterior wall to tie-downs. For instances, straps coupled (e.g., sewing, adhesives, mechanical fasteners, etc.) to the floor panels may engage with tie-downs coupled to the exterior wall (or vice versa). In tightening the tie-downs, the exterior wall may pull taut and secure the exterior wall in place.

In some instances, the top of the exterior wall may couple to the ceiling panels interior to a perimeter of the expandable shelter, such as the perimeter of the ceiling panels. Such coupling may prevent water permeation into the interior of the expandable shelter. Additionally, or alternatively, the exterior wall may be disposed over (e.g., drape) a perimeter of the floor panels. The exterior wall may therefore direct water, moisture, or other debris away from the interior of the expandable shelter. While certain examples illustrated and described herein show specific attachment mechanisms for attaching the exterior wall(s) to the ceiling and the floor of the expandable shelter, these examples are merely illustrative. In other examples, other attachment mechanisms may be used for attaching the exterior wall(s) to the ceiling and/or the floor.

The exterior wall may also include doors and/or windows and easily collapse into a stowed state for easy transportation.

In some instances, the expandable shelter may include appliances, such as ovens, refrigerators, exhaust fans, sinks, and/or fryers. The expandable shelter may also include counters, cabinetry, lockers, benches, beds, bunks, tables, and/or other objects. To secure the appliances and/or objects to the expandable shelter, a carrier, for instance, may be coupled to the appliances and/or the objects. The carrier may include wheels that allow the appliances and/or objects to move about the expandable shelter. The carrier may also include attachment or clamping mechanisms that secure the carrier to a track, receiver, or other mounting location of expandable shelter. Through an actuation of the clamping mechanisms the carrier may clamp and unclamp from the expandable shelter. For instance, the carrier may couple to a receiver or a track on the floor (or other portions) of the expandable shelter.

In some examples, the carrier may include wheels that enable the appliance or other object to be more easily manipulated and moved between stowed and deployed positions. The wheels of the carrier may reside within the track and the clamping mechanisms may engage with attachment mechanisms on the track. As an example, the track may include a trough, channel, or groove sized to receive the wheels of the carrier and attachment mechanisms (e.g., slots, receptacles, holes, protrusions, etc.) to which the clamping mechanism engage. Through a clamping motion of the clamping mechanisms, the clamping mechanisms may engage with the attachment mechanisms and the carrier may transition from an unclamped state to a clamped state, thereby securing the carrier to the expandable shelter. Through an unclamping motion, the carrier may transition from the clamped state to the unclamped state. In the unclamped state, the carriers, and therefore the appliances or other objects mounted to the carriers, may be permitted to move about the expandable shelter, while in the clamped state the appliances may be securely coupled to the expandable shelter, such as a during a transportation of the expandable shelter and/or in a deployed state. Collectively, the carrier and tracks may provide convenient attachment mechanism to secure the appliances to the expandable shelter in the stowed and/or deployed states. However, while the clamping mechanisms are discussed as securing the appliances or other objects, other brackets, plates, fasteners, straps, or locks may additionally or alternatively be used.

Example Transition from Stowed State to Deployed State

FIGS. 1A-1E illustrate a progressive deployment of an expandable shelter 100 from a stowed state to a deployed state. Beginning with FIG. 1A, the expandable shelter 100 is shown in the stowed state. In some instances, the expandable shelter 100 may attach, integrate, or otherwise couple to a trailer 102, which may transport the expandable shelter 100. In some examples, the trailer 102 may include leveling jacks 104 that deploy and level the expandable shelter 100.

As illustrated, in the stowed state, the expandable shelter 100 may resemble a compact enclosure that resides within a perimeter of the trailer 102. In some instances, in the stowed state, the expandable shelter 100 may have dimensions of substantially 96"×substantially 96"×substantially 168". Ceiling panels 106(1), 106(2), and 106(3) (hereinafter, collectively "ceiling panels 106") may define at least a portion of an exterior of the expandable shelter 100. In some instances, the ceiling panels 106 may align with the perimeter of the trailer 102 in the stowed state. A top ceiling panel 108 may define a top of the expandable shelter 100. In some instances, the ceiling panels 106 may couple to portions of the top ceiling panel 108 to secure the ceiling panels 106 to the expandable shelter 100. The ceiling panels 106 may include a plurality of hard and/or soft panels that may fold or otherwise collapse into a frame of the expandable shelter 100, and unfold during deployment. From the illustration shown in FIG. 1A, and as shown herein, the ceiling panels 106 may extend and transition from a stowed state to a deployed state.

Figure 1B:
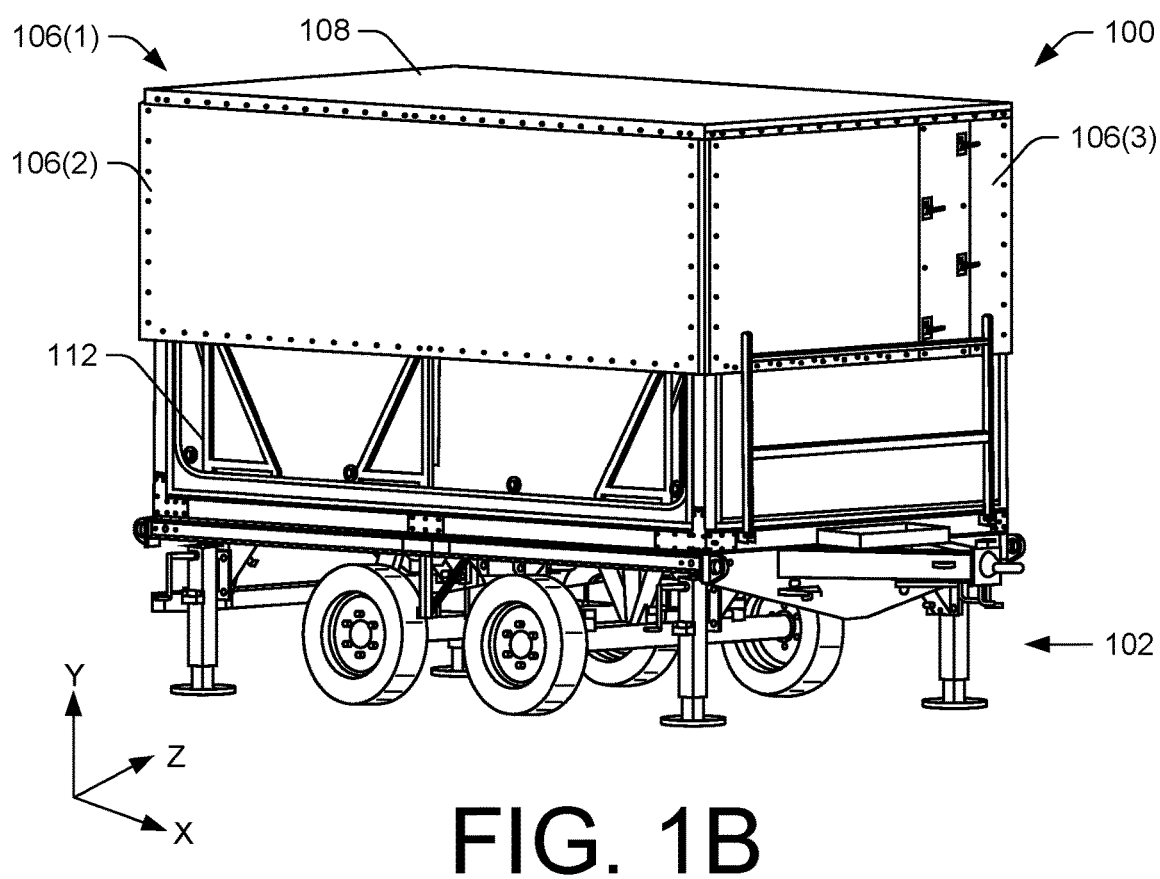
FIG. 1B is a perspective view of the example expandable shelter of FIG. 1, showing the example expandable shelter in a partially-deployed state.

FIG. 1B illustrates a portion of the expandable shelter 100 in a partially deployed state. For instance, FIG. 1B illustrates an upper portion of the expandable shelter 100 extending from a lower portion of the expandable shelter 100. With reference to the Cartesian (X-Y-Z) coordinate system, the expandable shelter 100 may deploy in the Y-direction. The expandable shelter 100 may include an upper frame that extends from a lower frame via an actuation of lifting mechanisms. The upper and lower frames are described in detail with reference to FIGS. 2-4, and the lifting mechanisms are described in detail with reference to FIGS. 5-7. The lifting mechanisms may raise the upper frame and in doing so, shown in FIG. 1B, the ceiling panels 106 and the top ceiling panel 108 are translated in the upward Y-direction, away from the trailer 102. Through lifting the upper frame, other components of the expandable shelter 100 may be configurable to the deployed state.

Figure 1C:
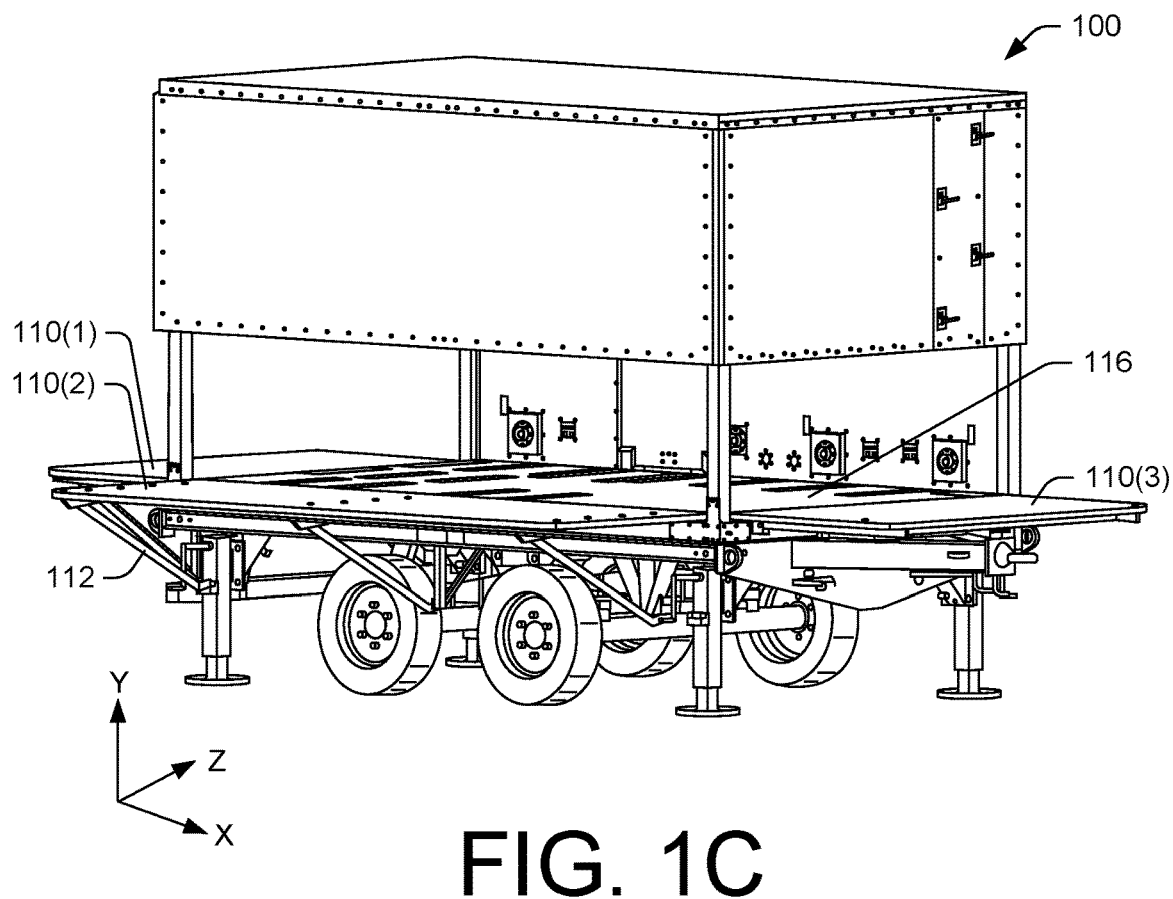
FIG. 1C is a perspective view of the example expandable shelter of FIG. 1, showing the example expandable shelter in a partially-deployed state.

FIG. 1C illustrates floor panels 110(1), 110(2), and 110(3) (hereinafter, collectively "floor panels 110") unfolding into the deployed state. The floor panels 110 may include a plurality of hard and/or soft panels that fold or otherwise collapse into a frame of the expandable shelter 100, and unfold during deployment. To illustrate and referencing both FIG. 1B and FIG. 1C, the floor panels 110 may fold outward from the stowed state (FIG. 1B) to the deployed state (FIG. 1C) in X- and Z-directions. In the deployed state, the floor panels 110 may abut, contact, engage, couple to, and/or brace against portions of the trailer 102. For instance, returning briefly to FIG. 1B, some of the floor panels 110 (e.g., the floor panel 110(2)) may include braces 112 disposed on an underside of the floor panels 110. When the floor panels 110 deploy, the braces 112 may brace against the trailer 102 (or the ground or other portions of the expandable shelter 100) to support to the floor panels 110. Some of the floor panels 110 (e.g., the floor panel 110(3)) may brace against the trailer 102 through other mounts, brackets, or supports 114 (see, e.g., FIG. 1A). For instance, the support 114 may fold downward in the Y-direction to rest on a tongue of the trailer 102 and the floor panel 110(3) may brace against the support 114 when deployed. In the deployed state, the floor panels 110 may fold to positions parallel and/or co-planar with a floor 116 of the expandable shelter. In doing so, the expandable shelter 100 may have an increased operational footprint and/or volume in the deployed state.

Figure 1D:
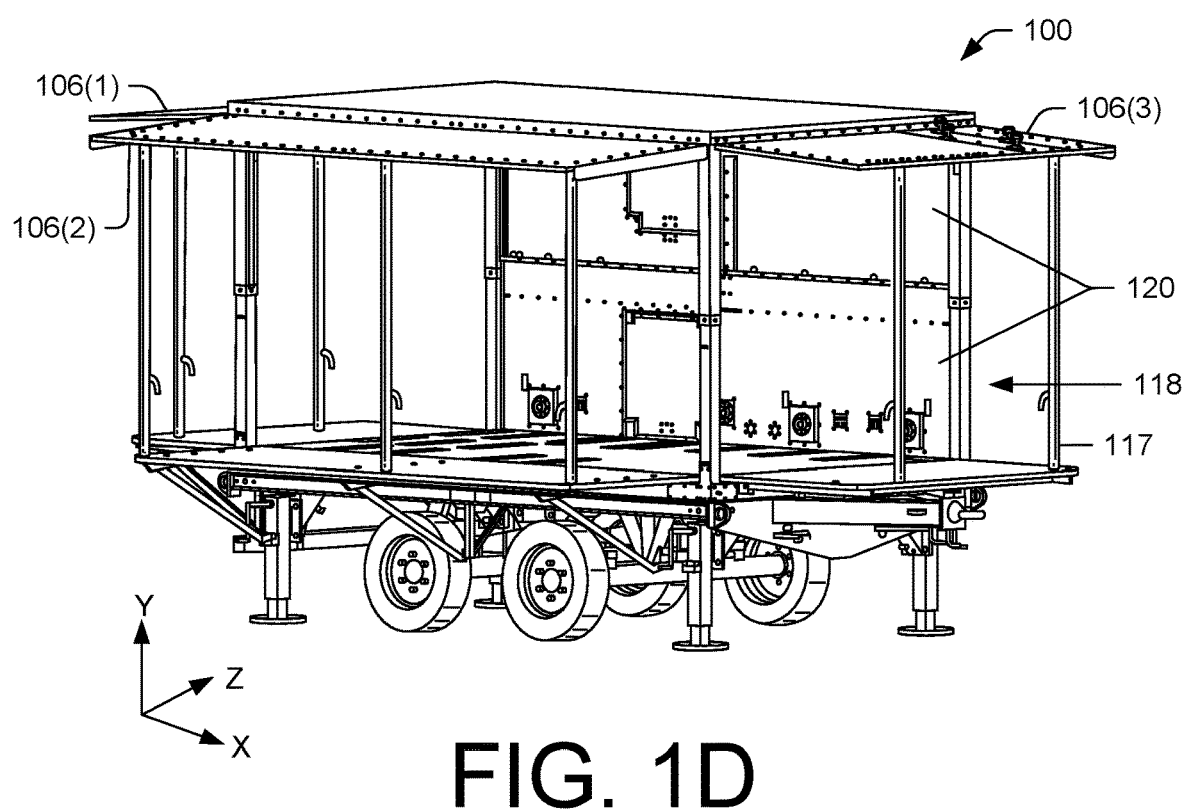
FIG. 1D is a perspective view of the example expandable shelter of FIG. 1, showing the example expandable shelter in a partially-deployed state.

FIG. 1D illustrates the ceiling panels 106 of the expandable shelter 100 in the deployed state. For instance, the ceiling panels 106 may rotate outward from their stowed state (see FIG. 1C) in X- and Z-directions and brace or couple to portions of the expandable shelter 100. In some instances, to support the ceiling panels 106 in their deployed state, a plurality of poles 117 extend between the floor panels 110 and the ceiling panels 106. The poles 117 may removably couple to the ceiling panels 106 and the floor panels 110 and brace the ceiling panels 106 in respective deployed states.

Additionally, or alternatively, in some instances the poles 117 may unfold from portions of the expandable shelter 100, such as the ceiling panels 106 and/or the floor panels 110. For example, the poles 117 may be integrated or coupled to the ceiling panels 106 and/or the floor panels 110, and may transition from a collapsed state to an erected state (as shown in FIG. 1D). Moreover, in some instances, the ceiling panels 106 may be supported by mechanisms other than the poles 117 in the deployed state, such as braces extending between the ceiling panels 106 and the expandable shelter 100, locking hinges, cables, and so forth.

Shown in FIG. 1D, deploying the floor panels 110 and the ceiling panels 106 exposes an interior 118 of the expandable shelter 100.

In the deployed state, the ceiling panels 106 may fold to a position co-planar or substantially co-planar with the top ceiling panel 108. In some instances, in the deployed state, the ceiling panels 106 and the floor panels 110 may be parallel or substantially parallel with one another. In some instances, the ceiling panels 106 may slope away from the expandable shelter 100 to repel water away from the interior 118. In that case, the ceiling panels 106 may not be parallel with the floor panels 110. For example, the ceiling panels 106 may be positioned at an oblique angle (e.g., between 1 degree and 20 degrees) relative to the floor panels 110.

In some instances, through utilizing hard-sided panels for the ceiling panels 106 and the floor panels 110, the expandable shelter 100 may quickly deploy and with considerable strength and rigidity. The ceiling panels 106 and the floor panels 110 may include structurally insulated panels (SIPs) which, in some instances, may include at least a layer of insulation material sandwiched between two thin outer skins made of wood, fiberglass, carbon fiber, metal, and/or other structural materials.

To transition the expandable shelter 100 to the stowed state, the poles 117 may be removed and the ceiling panels 106 may fold downward in the Y-direction, as shown in FIG. 1C. However, in some instances and as noted above, the poles 117 may be integral to portions of the expandable shelter 100 so as to not be removable, but rather, collapsible. For example, the poles 117 may fold into the ceiling panels 106 and/or the floor panels 110 to a collapsed state for storing and permitting the expandable shelter to transition to the stowed state.

Additionally, the expandable shelter 100 may include a hard-sided wall 120 configured to collapse and expand between stowed and deployed states. In other words, the ceiling panels 106 and the floor panels 110 may unfold/fold from less than all sides of the expandable shelter 100 and, in some instances, at least a portion of the perimeter of the expandable shelter 100 may be defined by the hard-sided wall 120.

Figure 1E:
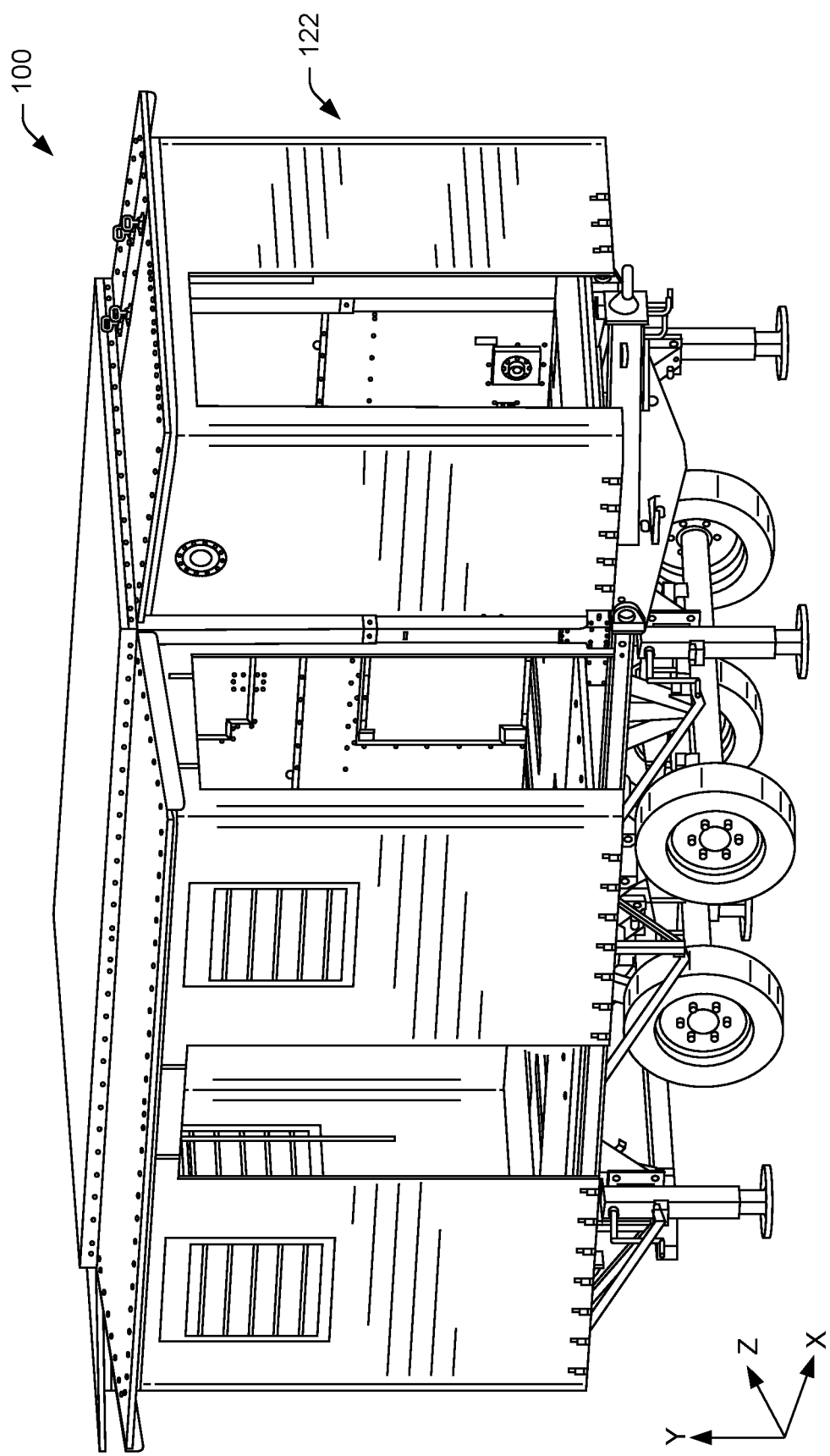
FIG. 1E is a perspective view of the example expandable shelter of FIG. 1, showing the example expandable shelter in a deployed state.

FIG. 1E illustrates an exterior wall 122 that encloses the interior 118. The exterior wall 122 may continuously extend around the perimeter of the expandable shelter 100 in the deployed state to environmentally insulate and seal (e.g., waterproof, weatherproof, prevent light leakage, etc.) the interior 118. In some instances, the exterior wall 122 may couple to the ceiling panels 106 through a system of channels disposed on respective ceiling panels 106. The coupling of the exterior wall 122 to the ceiling panels 106 may be within (i.e., spaced inwardly from) an outer perimeter of the ceiling panels 106 to prevent water from permeating into the interior 118. The exterior wall 122 may also couple to the expandable shelter 100 through tie-downs and/or straps.

In some instances, the exterior wall 122 may extend around less than all sides of the expandable shelter 100. For instance, certain sides of the expandable shelter 100 may include the hard-sided wall 120 while other sides of the expandable shelter 100 are constructed of the exterior wall 122. The exterior wall 122 may couple to portions of the hard-sided wall 120 to secure the exterior wall 122 through attachment mechanisms. The attachment mechanisms may pinch or clamp portions of the exterior wall 122 therebetween. Additionally, or alternatively, the attachment mechanisms may include hooks, zippers, magnets, channels, straps, snaps, etc. In some instances, however, the exterior wall 122 may extend around all sides of the expandable shelter 100.

The exterior wall 122 may also include windows, doors, or other access points that provide access to the interior 118 of the expandable shelter 100. Stairs may also couple to portions of the trailer 102 and/or the floor panels 106 to provide access to the interior 118 of the expandable shelter 100.

Example Lifting Mechanism

Figure 2:
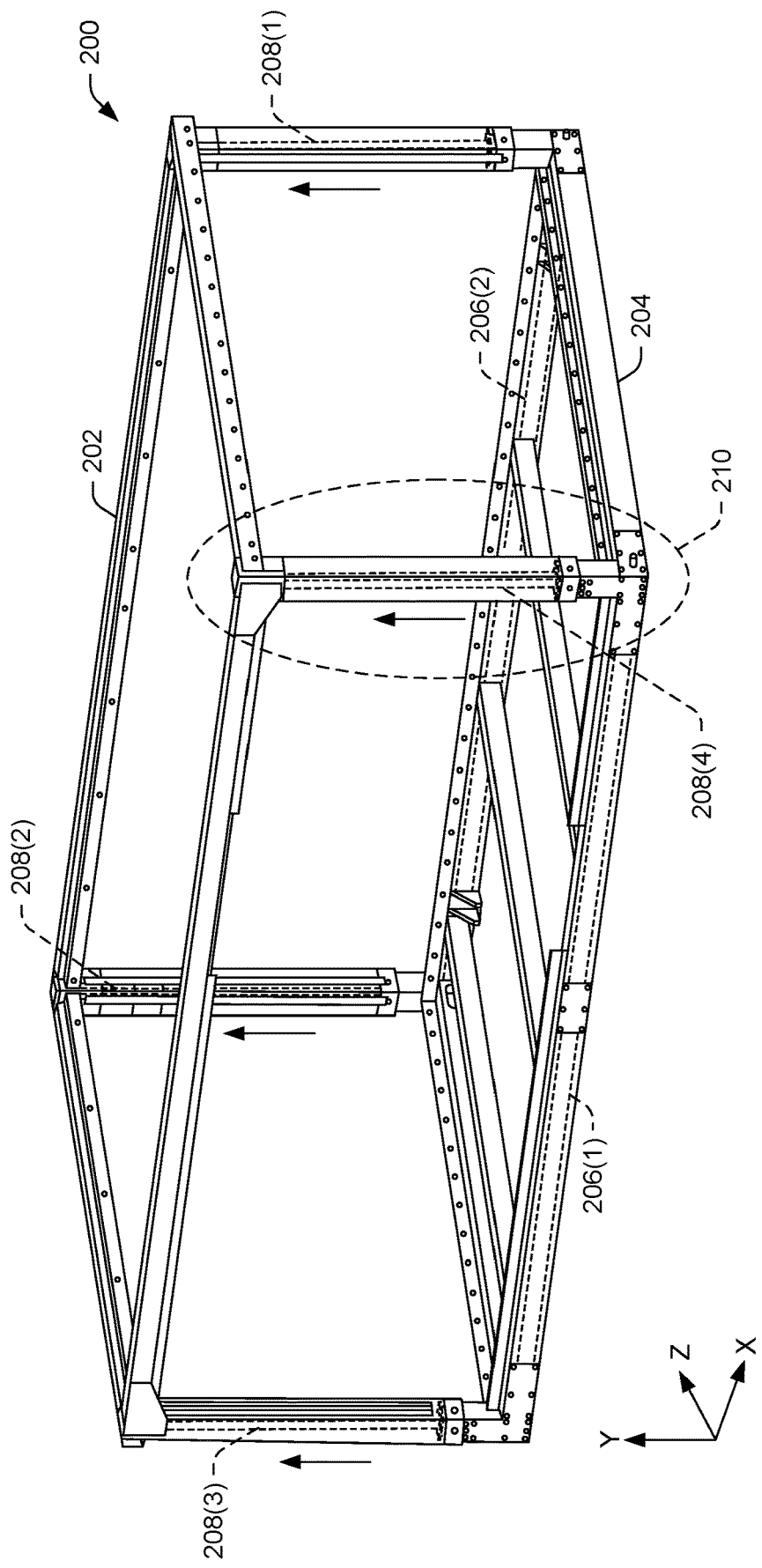
FIG. 2 is a perspective view of an example frame assembly of an expandable shelter.

FIG. 2 illustrates a frame assembly 200 of the expandable shelter 100. In some instances, the frame assembly 200 may couple to the trailer 102 or portions of the frame assembly 200 may be integrated with the trailer 102. For instance, structural members of the frame assembly 200 may also serve as structural members of the trailer 102. In some instances, the frame assembly 200 may have a rectangular perimeter that aligns with a perimeter of the trailer 102. In doing so, during transport, the expandable shelter 100 may comprise a compact rectangular prismatic enclosure. However, in some instances, the frame assembly 200 may be larger or smaller in perimeter than the trailer 102 and/or may include alternate perimeters or shapes than that shown in FIG. 2, such as being hexagonal, cylindrical, irregular shaped, and so forth.

The frame assembly 200 includes an upper frame 202 and a lower frame 204. In FIG. 2, the upper frame 202 and the lower frame 204 are shown in the stowed state, which corresponds to the stowed state of the expandable shelter 100. The upper frame 202 and the lower frame 204 are operably coupled to one another to transition the expandable shelter 100 between stowed and deployed states. For instance, shown in dashed lines, the lower frame 204 includes side-drive shafts 206(1) and 206(2) (hereinafter, collectively "side drive shafts 206") that extend in a lengthwise direction of the frame assembly 200 (X-direction). The side-drive shafts 206 may reside within framework of the lower frame 204, such as within tubes (e.g., circular or square) or channels of the lower frame 204. Also shown in dashed lines, vertical shafts 208(1), 208(2), 208(3), and 208(4) (hereinafter, collectively "vertical shafts 208") operably couple between the upper frame 202 and the lower frame 204. The vertical shafts 208 lift the upper frame 202 from the lower frame 204 and transition the expandable shelter 100 to the deployed state. Conversely, the vertical shafts 208 lower the upper frame 202 into the lower frame in the stowed state. That is, when actuated, the vertical shafts 208 may lift the upper frame 202 in the Y-direction to transition the expandable shelter 100 into the deployed state. The direction of lifting the upper frame 202 is shown by the arrows in FIG. 2. Each of the upper frame 202 and the lower frame 204 are discussed in turn below. Additionally, sectional view 210 is discussed in reference to FIG. 5 to illustrate the lifting mechanisms that deploy and stow the expandable shelter 100.

Figure 3:
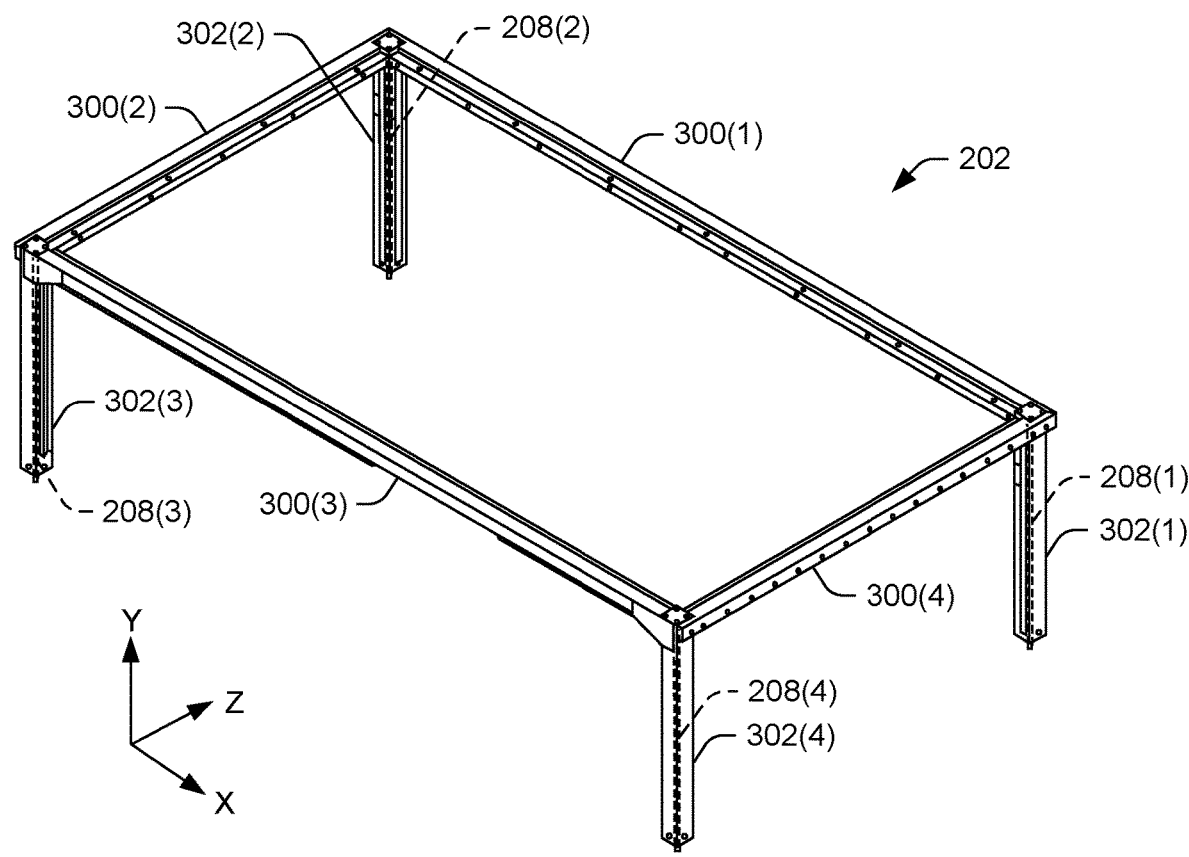
FIG. 3 is a perspective view of an upper frame of the example frame assembly of FIG. 2.

FIG. 3 illustrates the upper frame 202 of the frame assembly 200. The upper frame 202 may include upper frame members 300(1), 300(2), 300(3), and 300(4) (hereinafter, collectively "upper frame members 300"). The upper frame members 300 may be manufactured from metals (e.g., aluminum, steel, iron, stainless steel, titanium, magnesium, etc.), composites (e.g., fiberglass, carbon fiber, etc.), plastic, wood, projectile resistant materials (e.g., woven or non-woven synthetic materials such as Kevlar™, Twaron™, Dyneema™, etc.), and/or any combination thereof. The upper frame members 300 may couple to one another through fasteners (e.g., screws, bolts, rivets, etc.). Additionally or alternatively, the upper frame members 300 may be welded together. In some instances, corners of the upper frame 202 may include a hub having receptacles into which the upper frame members 300 slide into, over, or abut. Therein, the upper frame members 300 may be coupled (e.g., fasteners, welding, etc.) to the hub to form the upper frame 202. In some instances, utilizing a hub may assist in squaring the upper frame members 300, may reduce manufacturing time, and/or may increase a structural rigidity of the expandable shelter 100. When coupled, the upper frame members 300 form a perimeter of the upper frame 202. Gussets or other supports may also be included to increase a structural strength of the upper frame 202.

Disposed at the corners of the upper frame 202 are upper frame columns, supports, members, or posts 302(1), 302(2), 302(3), and 302(4) (hereinafter, collectively "upper frame posts 302"). In instances where the corners include the hub, the upper frame posts 302 may slide into, over, or abut receptacles of the hub. The cross sections of upper frame posts 302, for example, may be square, circular, hexagonal, c-shape channels, L-shape angles, I-beams, and/or any combination thereof. Additionally, the upper frame posts 302 may be disposed at other locations on the upper frame 202 other than the corners, such as along a length of the upper frame members 300. The upper frame 202 also may include additional or fewer upper frame posts than shown in FIG. 3.

Disposed within respective upper frame posts 302 are vertical shafts 208. For instance, the vertical shaft 208(1) may be disposed within the upper frame post 302(1), the vertical shaft 208(2) may be disposed within the upper frame post 302(2), the vertical shaft 208(3) may be disposed within the upper frame post 302(3), and the vertical shaft 208(4) may be disposed within the upper frame post 302(4). Discussed in detail herein, the vertical shafts 208 may extend from the upper frame posts 302 (Y-direction) in the deployed state to lift the upper frame 202 from the lower frame 204.

The ceiling panels 106 may couple to the upper frame 202, such as the upper frame members 300(2), 300(3), and 300(4). For instance, the ceiling panel 106(1) may couple along the upper frame member 300(2), the ceiling panel 106(2) may couple along the upper frame member 300(3), and the ceiling panel 106(3) may couple along the upper frame member 300(4). To allow the ceiling panels 106 to transition between stowed and deployed states (see FIG. 1C and FIG. 1D), the ceiling panels 106 may be rotatably coupled to the respective upper frame members 300 (e.g., by one or more hinges). Additionally, the top ceiling panel 108 may couple to a top of the upper frame 202 and form a substantially planar surface in the X-Z plane.

Figure 4:
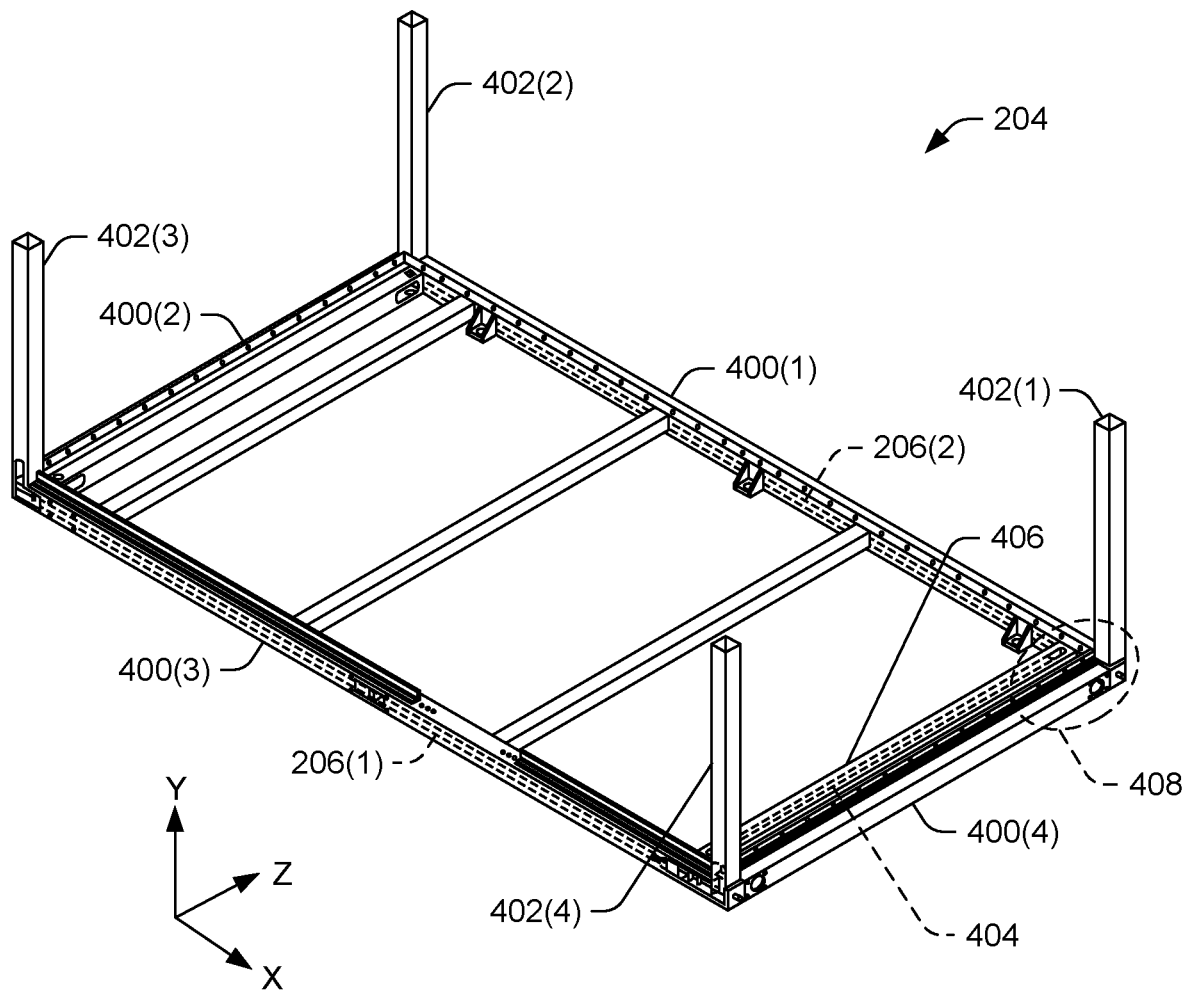
FIG. 4 is a perspective view of a lower frame of the example frame assembly of FIG. 2.

FIG. 4 illustrates the lower frame 204 of the frame assembly 200. The lower frame 204 may include lower frame members 400(1), 400(2), 400(3), and 400(4) (hereinafter, collectively "lower frame members 400"). The lower frame members 400 may be manufactured from metals (e.g., aluminum, steel, iron, stainless steel, titanium, magnesium, etc.), composites (e.g., fiberglass, carbon fiber, etc.), plastic, wood, projectile resistant materials (e.g., woven or non-woven synthetic materials such as Kevlar™, Twaron™, Dyneema™, etc.), and/or any combination thereof. The lower frame members 400 may couple to one another through fasteners (e.g., screws, bolts, rivets, etc.). Additionally, or alternatively, the lower frame members 400 may be welded together. In some instances, corners of the lower frame 204 may include a hub having receptacles into which the lower frame members 400 slide into, over, or abut. Therein, the lower frame members 400 may be coupled (e.g., fasteners, welding, etc.) to the hub to form the lower frame 204. In some instances, utilizing a hub may assist in squaring the lower frame members 400, may reduce manufacturing time, and/or may increase a structural rigidity of the expandable shelter 100. When coupled, the lower frame members 400 form a perimeter of the upper frame 204. Gussets may be included to increase a structural strength of the lower frame 204. Additionally, cross members may be coupled between the lower frame members 400, such as between the lower frame member 400(1) and the lower frame member 400(3).

Disposed at the corners of the lower frame 204 are lower frame columns, supports, or posts 402(1), 402(2), 402(3), and 402(4) (hereinafter, collectively "lower frame posts 402"). In instances where the corners include the hub, the lower frame posts 402 may slide into, over, or abut receptacles of the hub. The lower frame posts 402 may be square, circular, hexagonal, c-shape channels, L-shape angles, I-beams, and/or any combination thereof. Additionally, the lower frame posts 402 may be disposed at other locations on the lower frame 204 other than the corners, such as along a length of the lower frame members 400. The lower frame 204 may include additional or fewer lower frame posts 402 than shown in FIG. 4.

The lower frame posts 402 may correspond to and align with the upper frame posts 302 such that the lower frame posts 402 engage with the upper frame posts, and vice versa. In some instances, the upper frame posts 302 may also include a larger cross-sectional dimension than a cross-sectional dimension of the lower frame posts 402, thereby allowing the upper frame posts 302 to slide or be disposed over the lower frame posts 402, as shown in FIG. 2. That is, returning briefly to FIG. 2, in the stowed state, the upper frame posts 302 are shown disposed over respective lower frame posts 402. In this sense, the upper frame posts 302 may telescope over the lower frame posts 402. To allow this interaction, the lower frame posts 402 are disposed at locations on the lower frame 204 corresponding to the locations of the upper frame posts 302 on the upper frame 202. A size and shape of the upper frame posts 302 and the lower frame posts 402 are also appropriately sized to allow the lower frame posts 402 to fit within the upper frame posts 302 in the stowed state. Additionally, the upper frame posts 302 may include slots within an interior of the upper frame posts 302 such that the lower frame posts 402 are permitted to fit within the upper frame posts 302 in the stowed state. To assist in the interaction between the upper frame posts 302 and the lower frame posts 402, bushings, bearings, guides, or wear plates may be included.

Additionally, or alternatively, the upper frame posts 302 and the lower frame posts 402 may have complimentary shapes (e.g., C-channel, I-channels, etc.) that engage or slide over/within one another. For instance, the upper frame posts 302 may comprise a first C-channel and the lower frame posts may comprise a second C-channel. The second C-channel may be sized larger than or smaller than the first C-channel to either reside within the first C-channel or over the first C-channel, in the stowed state, and slide over one another in the deployed state. In such instances, the first C-channel and the second C-channel may be complimentary to provide structural support during a deployed state and a stowed state of the expandable shelter 100.

Figure 7:
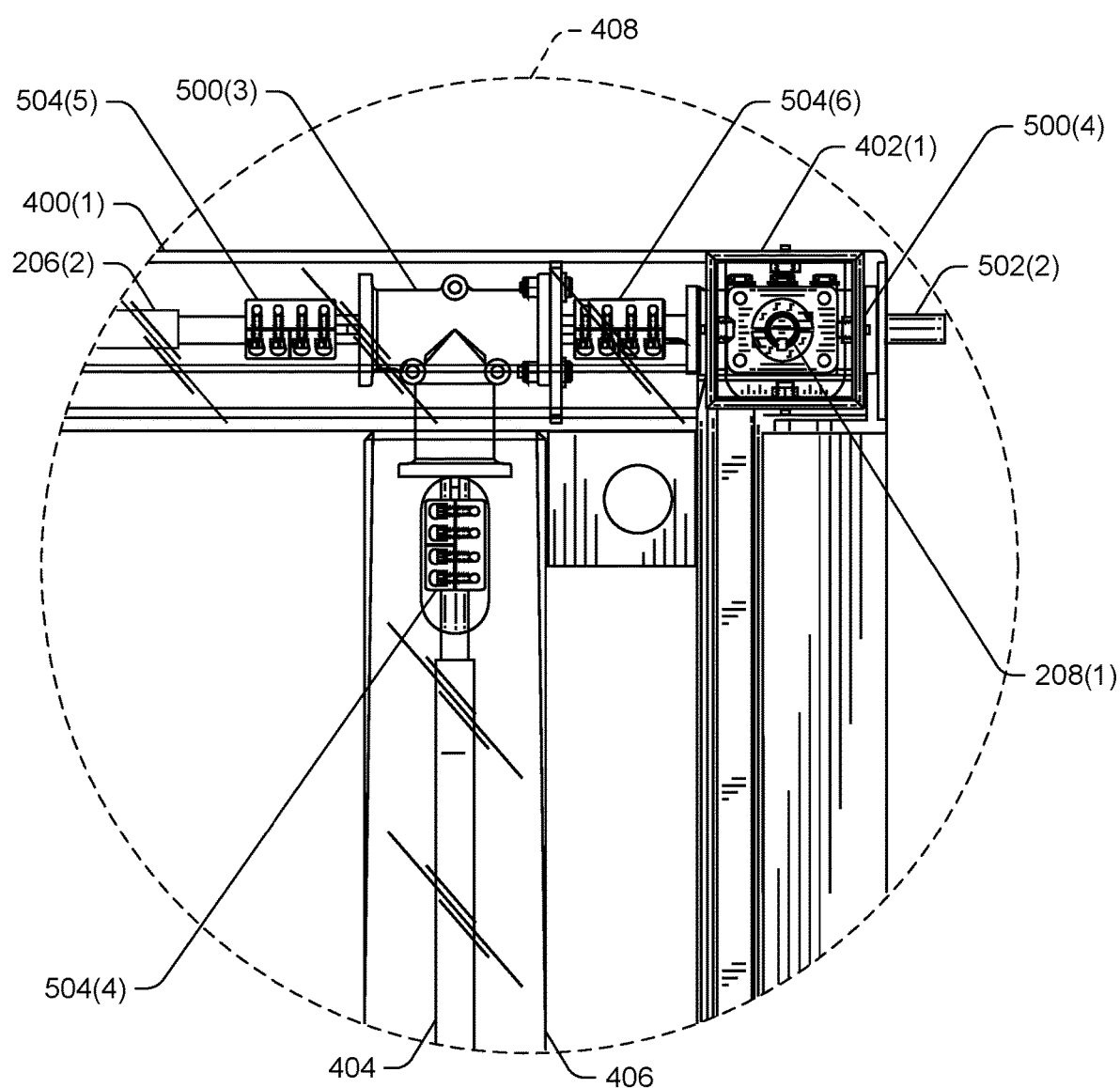
FIG. 7 is a partial pan view of the example lifting mechanism of FIG. 5, with one or more walls of the frame omitted for visibility.

Disposed within some of the lower frame members 400 may be the side-drive shafts 206. For instance, as shown by the dashed lines, the side-drive shaft 206(1) may be disposed within the lower frame member 400(3) and the side-drive shaft 206(2) may be disposed within the lower frame member 400(1). The side-drive shafts 206 may operably couple to one another through a cross-drive shaft 404, which is also shown in dashed lines. The cross-drive shaft 404 may be disposed within a cross member 406 of the lower frame 204. Details of the interaction between the side-drive shafts 206 and the cross-drive shaft 404 is shown in FIG. 7, as indicated by 408.

The floor panels 110 may couple to sides of the lower frame 204, such as the lower frame members 400(2), 400(3), and 400(4). For instance, the floor panel 110(1) may couple along the lower frame member 400(2), the floor panel 110(2) may couple along the lower frame member 400(3), and the floor panel 110(3) may couple along the lower frame member 400(4). To allow the floor panels 110 to transition between stowed and deployed states (see FIG. 1B and FIG. 1C), the floor panels 110 may rotatably couple to respective lower frame members 400 (e.g., by one or more hinges).

In the stowed state, the floor panels 110 may reside within a perimeter of the upper frame 202. For instance, as the upper frame posts 302 reside over the lower frame posts 402 in the stowed state (see FIG. 2), the respective floor panels 110 include a length that allows the respective floor panels 110 to fold into and reside within a distance between the upper frame posts 402. To illustrate, and referencing FIG. 3, the floor panel 110(2) may have a length smaller than a distance between the upper frame post 302(3) and the upper frame post 302(4). Additionally, to allow the floor panels 110 to fold within the upper frame 202, a height of floor panels 110 fits within upper frame members 300 and lower frame members 400. For instance, a height of the floor panel 110(2) (Y-direction in FIG. 1B or Z-direction in FIG. 1C) may reside within the upper frame member 300(3) and the lower frame member 400(3) when the frame assembly 200 is in the stowed state. In doing so, the floor panels 110 may fold within a perimeter of the frame assembly 200, thereby making the expandable shelter 100 a compact enclosure. Thereafter, the respective ceiling panels 106 may enclose the respective floor panels 110, resembling the illustration shown in FIG. 1A.

In some instances, the upper frame posts 302 and/or the lower frame posts 402 may include clips, tabs, pins, latches, brackets, or other components that secure the ceiling panels 106 and/or the floor panels 110 in the stowed state. For instance, the upper frame posts 302 may include wedges that secure the floor panels 100 within the frame assembly 200. The wedges may prevent the floor panels 110 shifting during a transport of the expandable shelter 100. Other guides may also be included to assure that the frame assembly 200 properly collapses during the stowing of the expandable shelter 100.

Figure 5:
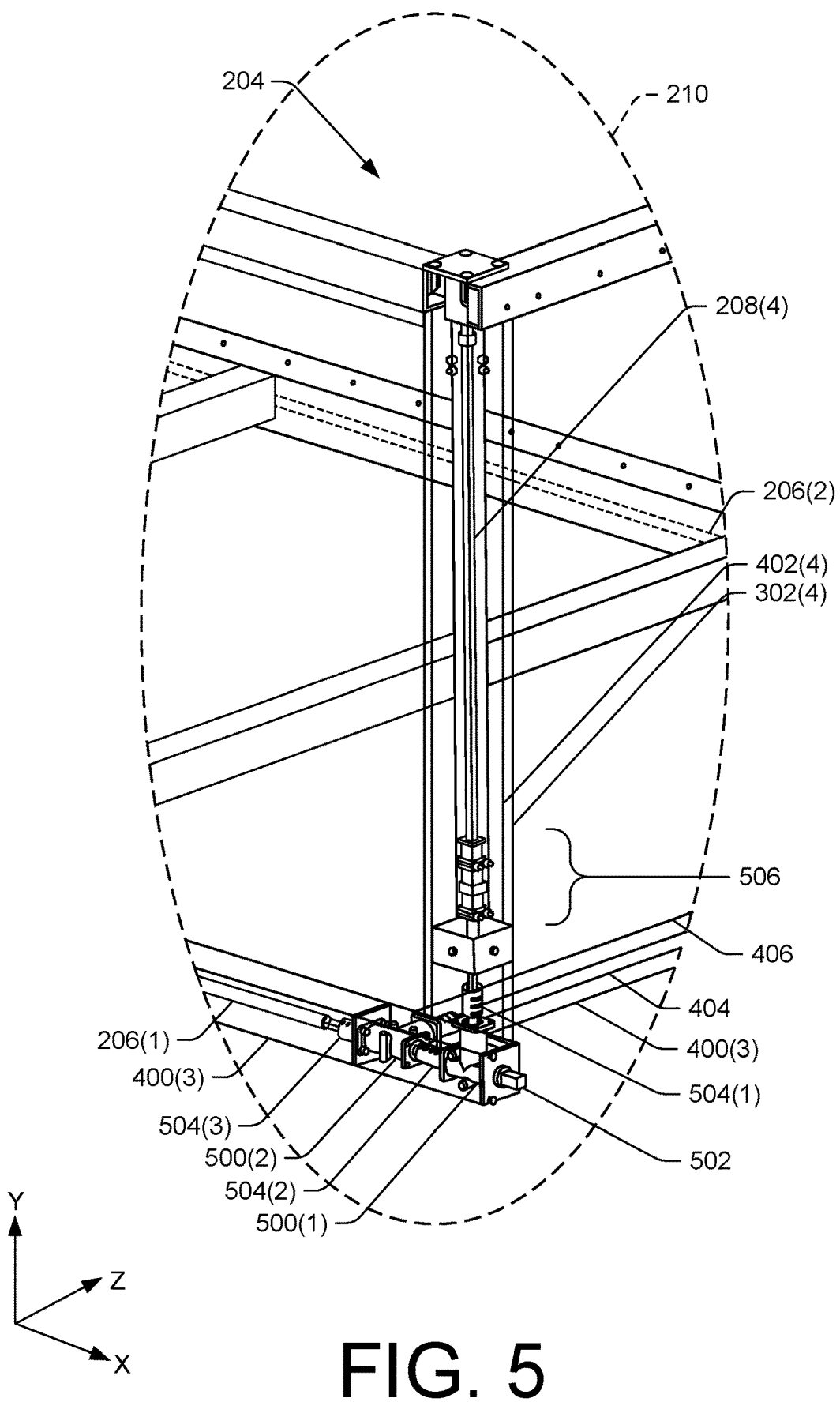
FIG. 5 is a perspective view of an example lifting mechanism of an example expandable shelter, with one or more walls of the frame omitted for visibility.

FIG. 5 is an enlarged detail view of the sectional view 210 illustrated in FIG. 2 and illustrates an interaction between the side-drive shafts 206, the vertical shafts 208, and the cross-drive shaft 404. Specifically, FIG. 5 illustrates the side-drive shaft 206(1), the vertical shaft 208(4), and the cross-drive shaft 404, as well as their interaction. However, it is to be understood that the sectional view 210, as well as the discussion of FIG. 5, may represent the interaction between other side-drive shafts 206, other vertical shafts 208, and the cross-drive shaft 404. FIG. 5 also illustrates the upper frame post 302(4), the lower frame member 400(3), the cross member 406, and the lower frame post 402(4) being transparent to illustrate components residing therein, respectively. As noted above, FIG. 5 illustrates that the lower frame post 402(4) is disposed within an interior of the upper frame post 302(4) in the stowed state to allow the lower frame 204 to telescope within the upper frame 202.

The expandable shelter 100 may include gear drives or gear boxes 500(1) and 500(2) (which may be referred to herein as "gear box 500" or "gear boxes 500" unless specifically noted) that operate to transition the frame assembly 200 between stowed and deployed states. Additionally, other gear boxes 500 may be included other than those shown in FIG. 5. Generally, therefore, gear boxes of the expandable shelter 100 may be referred to as "gear box 500" or "gear boxes 500." Additionally, or alternatively, the expandable shelter 100 may include hydraulic pumps, air compressors, manifolds, and/or conduit/lines that actuate hydraulic and/or pneumatic cylinders disposed at the corners. These hydraulic or pneumatic cylinders may operate to transition the frame assembly 200 between stowed and deployed states.

The gear boxes 500 are arranged, oriented, and configured to transfer or redirect rotational movement between the side-drive shafts 206, the vertical shafts 208, and the cross-drive shaft 404. In some instances, the gear boxes 500 may include gears such as worm gears, bevel gears, rack and pinions, spiral bevel gears, helical gears, spur gears, internal gears, or any combination thereof, disposed within a housing of the gear boxes 500. The gears within the gear box 500 permit the transfer or redirection of rotational movement between the side-drive shafts 206, the vertical shafts 208, and the cross-drive shaft 404.

For purposes of illustrating the operation of the gear boxes 500, the discussion with regard to FIG. 5 will relate to deploying the expandable shelter 100, unless noted otherwise. That is, throughout the discussion of FIG. 5, which illustrates the frame assembly 200 in the stowed state, the process of deploying the expandable shelter 100 from the stowed state is detailed.

In some instances, the gear boxes 500 may receive rotational movement, or other movement, via an input 502. In this example, the input 502 is shown as a square stub shaft, but in other examples, the input 502 may comprise a keyed shaft, a knob, an actuator, a button, a lever, a socket (with any non-circular receptacle shape), or any other component capable of being engaged by a driver (e.g., by a lever, wrench, ratchet, crank, electric motor, drill motor, etc.). The input 502 may provide mechanical, electrical, hydraulic, pneumatic, or other inputs that cause the lifting mechanism or the linear actuators to stow and deploy the expandable shelter 100. For instance, the input 502 may rotate through movement of the driver (not shown) or other mechanism that couples to the input 502. An end of the input 502 opposite the driver may include a gear (e.g., bevel gear) that rotates with a rotational movement of the input 502. For instance, the input 502 may rotate about the X-axis in the clockwise direction in response to a rotation of the driver about the X-axis in the clockwise direction. In this sense, the input 502 may transfer rotational movement into the gear box 500(1). The gear box 500(1) may include gears (e.g., bevel gears) that redirect or transfer the rotational movement of the input 502 to rotational movement of the vertical shaft 208(4). As a result, the vertical shaft 208(4) may rotate about the Y-axis (in either a clockwise or counter clockwise direction). Accordingly, as the input 502 is rotated, the gear box 500(1) may transfer the rotational movement of the input 502 about the X-axis to cause the vertical shaft 208(4) to rotate about the Y-axis. The gear box 500(1) may couple to the vertical shaft 208(4) via a coupler 504(1).

Rotation of the vertical shaft 208(4) may cause the expandable shelter 100 to transition from the stowed state to the deployed state. More particularly, portions of the vertical shaft 208(4) may be threaded (e.g., ACME® screw) and operably couple or engage with a jack screw assembly 506. The jack screw assembly 506 is configured to convert the rotational movement of the vertical shaft 208(4) into linear movement to lift the upper frame 202 in the Y-direction, thereby causing the expandable shelter 100 to deploy. Details of the jack screw assembly 506 are discussed with reference to FIG. 6.

In addition to transferring rotational movement to the vertical shaft 208(4), the gear box 500(1) transfers rotational movement to other gear boxes 500. For instance, FIG. 5 illustrates the gear box 500(1) being coupled to the gear box 500(2) through a coupler 504(2). In some instances, the gear box 500(1) may transfer rotational movement to the gear box 500(2) about the same axis of rotation as the input 502. That is, the gear box 500(2) may receive rotational movement from the gear box 500(1) about the X-axis and may rotate about the X-axis as well.

The gear box 500(2) may include gears (e.g., bevel gears) that redirect or transfer rotational movement to the cross-drive shaft 404. In doing so, the gears within the gear-box 500(2) may cause the cross-drive shaft 404 to rotate about the Z-axis (in either a clockwise or counter clockwise direction). The cross-drive shaft 404 may couple to the gear box 500(2) via a coupler (not labeled). Although FIG. 5 only illustrates one end of the cross-drive shaft 404, on an opposite end not coupled to the gear box 500(2), the cross-drive shaft 404 may couple to another gear box 500 to transfer a rotational movement to the cross-drive shaft 206(2). Discussed herein, the cross-drive shaft 206(2) may transfer, via one or more gear boxes 500, rotational movement to the vertical shafts 208 (e.g., the vertical shaft 208(1) and the vertical shaft 208(2)) to deploy the expandable shelter 100.

Moreover, in addition to transferring rotational movement to the cross-drive shaft 404, the gear box 500(2) may transfer rotational movement to the side-drive shaft 206(1) to rotate the side-drive shaft 206(1) about the X-axis. The side-drive shaft 206(1) may couple to the gear box 500(2) via a coupler 504(3) (coupler 504(1), coupler 504(2), and coupler 504(3) may collectively be referred to herein as "couplers 504" or generally and/or individually as "coupler 504"). The side-drive shaft 206(1) may transfer rotational movement to other gear boxes 500, which in turn, may transfer rotational movement to the vertical shaft 208(3).

The side-drive shafts 206, the vertical shafts 208, and the cross-drive shaft 404 may therefore interconnect through a system of gear boxes 500 and couplers 504 to transition the expandable shelter 100 between stowed and deployed states thereby serving as a lifting mechanism for the expandable shelter 100. By way of illustration, an end of the side-drive shaft 206(1) not coupled to the gear box 500(2) may extend in the X-direction and couple to other gear boxes 500 to transfer rotational movement to the vertical shaft 208(3). That is, the gear box 500 coupled to an end of the side-drive shaft 206(1) not coupled to the gear box 500(2) may transfer the X-axis rotational movement of the side-drive shaft 206(1) to the vertical shaft 208(3). To this end, corners of the frame assembly 200 may include the gear boxes 500 and couplers 504 (similar to that shown in FIG. 5) to transfer rotational movement to the vertical shafts 208. FIG. 5 may therefore generally depict corners of the frame assembly 200.

Furthermore, as noted above, with the gear boxes 500 (e.g., the gear box 500(1)), rotational movement of the input 502 is transferred to the vertical shafts 208(1) and 208(2) via the cross-drive shaft 404 and gear boxes 500 to deploy the expandable shelter 100. The side-drive shafts 206, the vertical shafts 208, the cross-drive shaft 404 may therefore interconnect and function as the lifting mechanism that transitions the expandable shelter 100 from the stowed state to the deployed state. Moreover, the interconnection of the vertical shafts 208 also allow the expandable shelter 100 to deploy at a constant rate. Corners of the frame assembly 200 (e.g., the upper frame posts 302) may lift in unison to prevent binding or pinching during deployment.

The lifting mechanism may be operable from a single input to deploy the expandable shelter 100. More particularly, in some instances, through an operation of a single input 502 receiving rotational movement, each corner of the frame assembly 200 may lift in unison. That is, while each corner of the frame assembly 200 may include an input 502 to receive the driver (for instance) the expandable shelter 100 may deploy through any one of the inputs 502 receiving rotational movement. In other words, despite having multiple inputs 502, the expandable shelter 100 may deploy when only one input 502 is rotated via the driver as the system of side-drive shafts 206, the cross-drive shafts 404, the gear boxes 500, and the couplers 504 transfer rotational movement to each vertical shaft 208. The expandable shelter 100 may therefore deploy from any corner, which may be useful such as when one of the input 502 is inaccessible due to obstacles (e.g., tree, barricade, etc.).

In some instances, a clockwise rotational movement of the input 502 about the X-axis may correspond to deploying the expandable shelter 100 while a counter clockwise directional movement of the input 502 about the X-axis may correspond to stowing the expandable shelter 100, or vice versa. Therefore, to stow the expandable shelter 100 from the deployed state, the driver, for instance, may be rotated in an opposite direction. Similar to the mechanisms involved in the deployment of the expandable shelter 100, the expandable shelter 100 may stow in a comparable manner.

The gear boxes 500 may be disposed within portions of the lower frame 202, such as portions of the lower frame posts 402. For instance, FIG. 5 illustrates the gear box 500(1) and the gear box 500(2), as well as the couplers 504, being disposed within the lower frame member 400(3), the lower frame post 402(4), and/or the cross member 406. Portions of the gear boxes 500 and/or the couplers 504 may be accessible through openings in the lower frame members 400, for instance. Additionally, the input 502 may be disposed exterior to the lower frame 204 to provide access to the input 502 or the lower frame 204 may include ports that provide access to the input 502.

In some instances, the gear box 500(1) and the gear box 500(2) may include similar components but may be oriented in different directions within the frame assembly 200. For instance, the gear box 500(1) may be disposed along an axis in the X-Y direction while the gear box 500(2) may be disposed along an axis in the X-Z direction. The gear box 500(1) may be rotated about the X-axis.

In some instances, the gear boxes 500 may be alternatively designed. For instance, gear boxes may include more than two couplable shafts to transfer the rotational movement. As an example, a gear box may transfer rotational movement to the vertical shaft 208(4), the side-drive shaft 206(1), and the cross-drive shaft 404. In that case, in some instances, the gear box 500(2) may be omitted.

Figure 6:
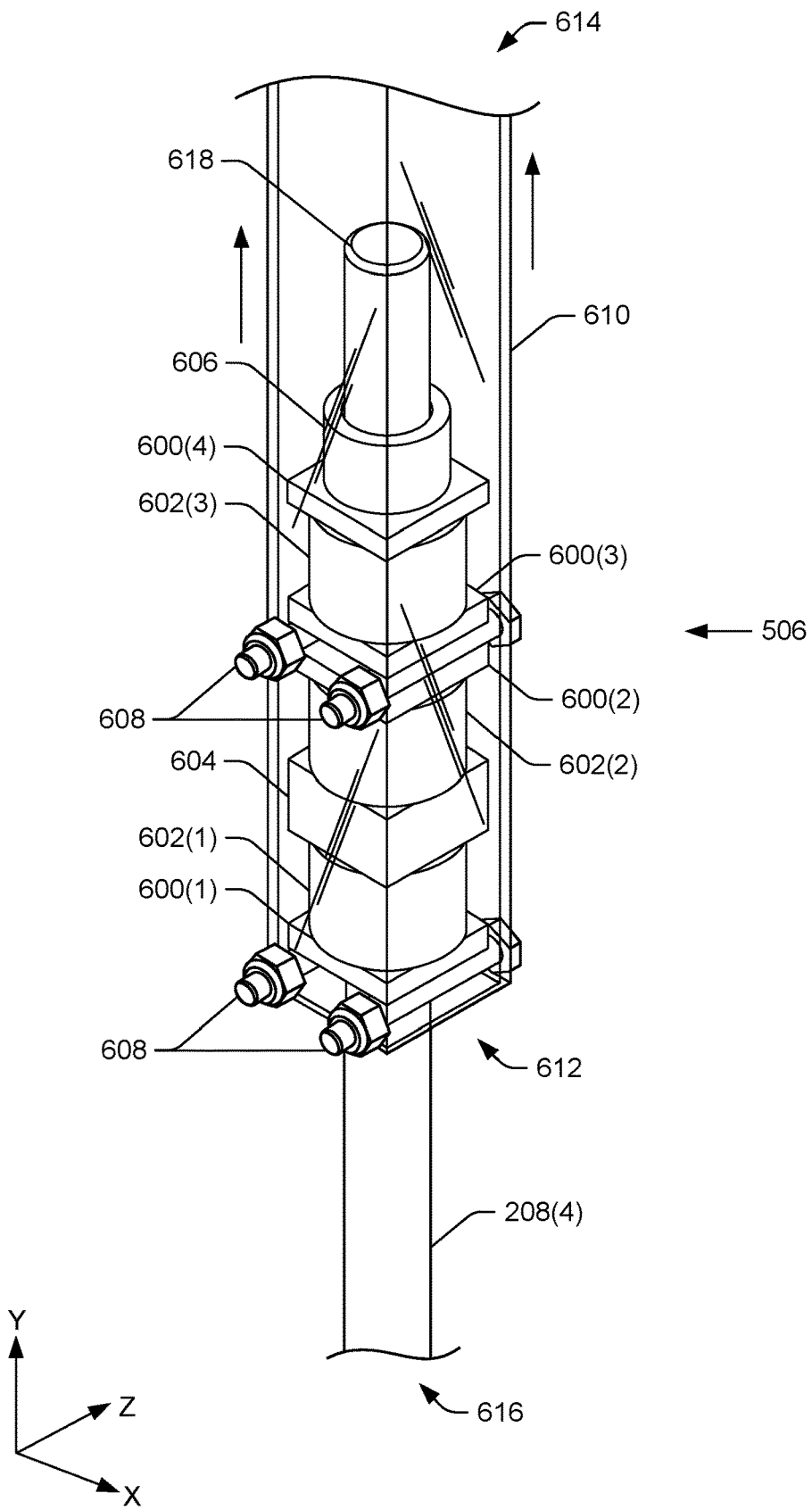
FIG. 6 is a partial perspective view of the example lifting mechanism of FIG. 5, with one or more walls of the frame omitted for visibility.

FIG. 6 illustrates components of the screw jack assembly 506. The screw jack assembly 506 may include plates 600(1), 600(2), 600(3), and 600(4) (collectively, hereinafter "plates 600"), springs 602(1), 602(2), and 602(3) (collectively, hereinafter "springs 602"), a nut 604, a stop nut 606, and fasteners 608. The screw jack assembly 506 may reside within a housing 610 having a first end 612 and a second end 614. The screw jack assembly 506 may be coupled to the upper frame 202 such that as the vertical shafts 208 rotate and the screw jack assembly 506 is driven upward, the upper frame 202 is lifted from the lower frame 204. Although labeled as the vertical shaft 208(4), FIG. 6 may represent the interaction between other vertical shafts 208 and the screw jack assembly 506.

As noted above with reference to FIG. 5, the coupling of the vertical shaft 208(4) and the screw jack assembly 506 may transition the expandable shelter 100 between stowed and deployed states. To illustrate, the vertical shaft 208(4) is threaded between a first end 616 of the vertical shaft 208(4) and a second end 618 of the vertical shaft 208(4) (or portions thereof) to engage with the nut 604. In some instances, the nut 604 and/or the stop nut 606 may be the only components of the screw jack assembly 506 coupled to the vertical shaft 208(4). A rotation of the vertical shaft 208(4) causes the vertical shaft 208(4) to thread through the nut 604. When rotated, a distance between the second end 618 of the vertical shaft 208(4) and the nut 604 may decrease or increase (depending on the directional rotation). As the vertical shaft 208(4) threads through the nut 604 about the Y-axis in a clockwise direction, for instance, the expandable shelter 100 may deploy, while rotation in an opposite direction causes the expandable shelter 100 to stow, or vice versa.

Compared to FIG. 5, which represents the expandable shelter 100 in the stowed state, FIG. 6 represents the expandable shelter 100 in the deployed state. For example, as shown in FIG. 6, the screw jack assembly 506 is disposed proximate to the second end 618 of the vertical shaft 208(4). In FIG. 5, and in the stowed state, the screw jack assembly 506 is disposed proximate to the first end 616, and hence, a greater length is disposed between the screw jack assembly 506 and the second end 618 to permit the vertical shaft 208(4) to thread through the screw jack assembly 506 and transition the expandable shelter 100 to the deployed state.

The jack screw assembly 506 may couple to the housing 610 through the fasteners 608 such that as the vertical shaft 208(4) rotates about the Y-axis in the clockwise direction, the vertical shaft 208(4) may linearly extend out of the housing 610. The second end 614 of the housing 610 may couple to portions of the upper frame 202, such as the upper frame members 300 and/or the upper frame posts 302, to support the housing 610 and permit the vertical shaft 208(4) to extend out of the housing 610. That is, when the vertical shaft 208(4) is rotated, the coupling of the housing 610 and the upper frame 202 may push the upper frame 202 in the Y-direction, thereby deploying the expandable shelter 100. Movement of the housing 610 is shown via the arrows included within FIG. 6.

In some instances, the vertical shaft 208(4) and the jack screw assembly 506 may resemble a screw jack. That is, the threads of the vertical shaft 208(4) may include a worm gear that engages with corresponding threads of the nut 604. In rotating the vertical shaft 208(4) about the Y-axis in the clockwise direction, the housing 610 may displace in the Y-direction through the coupling of the jack screw assembly 506 and the housing 610 via the fasteners 608, thereby driving the vertical shaft 208(4) out of the housing 610 and deploying the expandable shelter 100.

To receive rotational movement, the first end 616 of the vertical shaft 208(4) may couple to the gear box 500(1) via the coupler 504(1). The stop nut 606 may prevent the vertical shaft 208(4) disengaging with the jack screw assembly 506 (e.g., over deploying). For example, in some instances, the stop nut 606 may be welded to the vertical shaft 208(4) and/or a length proximate to the second end 618 of the vertical shaft 208(4) may not include threads, thereby preventing disengagement.

In some instances, the nut 604 may function as a floating nut through the incorporation of the springs 602 (e.g., the spring 602(1) and the spring 602(2)). The floating nut may allow for the frame assembly 200 to deploy and stow even in instances where the frame assemblies (e.g., corners) are not perfectly aligned or at even heights (i.e., one corner may be lower or higher than other corners). In other words, the floating nut may prevent binding of the various components (e.g., vertical shafts 208, upper frame posts 302, lower frame posts 402, etc.) while deploying and stowing the expandable shelter 100. Additionally, the floating nut may be "floating" in the sense that it is not coupled to the frame assembly 200, but rather, may "float" relative to the frame assembly 200, or components thereof.

The springs 602 may evenly distribute weight of expandable shelter 100 during deployment or stowing of the expandable shelter 100. For instance, the springs 602 within each jack assembly 506 may distribute weight of the upper frame 202 amongst each other such that the expandable shelter 100 either deploys or stows in unison. The plates 600 may provide a foundation or platform for the springs 602 within the housing 610.

FIG. 7 illustrates the cross-sectional view 408 and shows the lower frame member 400(1), the lower frame post 402(1), and the cross member 406 being translucent to illustrates components within.

The cross-drive shaft 404 transfers rotational movement to the gear box 500(3). The gear box 500(3) may include gears that transfer the rotational movement of the cross-drive shaft 404 to the side-drive shaft 206(2) and the vertical shaft 208(1). For instance, as discussed above with regard to FIG. 5, the cross-drive shaft 404 may rotate about the Z-axis when the input 502 (of FIG. 5) is actuated through a coupling with the gear box 500(2). The cross-drive shaft 404 may couple to the gear box 500(3) through a coupler 504(4). The gear box 500(3) may redirect the rotational movement about the Z-axis into a rotational movement about the X-axis, for instance, using bevel gears. In doing so, the side-drive shaft 206(2) may rotate about the X-axis, through a coupling with the gear box 500(3) via a coupler 504(5), and transfer rotational movement to the vertical shaft 208(2). Additionally, the coupling of the gear box 500(3) with a gear box 500(4) through a coupler 504(6) causes the vertical shaft 208(1) to rotate about the Y-axis. That is, the gear box 500(4) may redirect the rotational movement about the X-axis to cause the vertical shaft 208(1) to rotate. As noted above, depending on the direction of rotation of the vertical shafts 208, the expandable shelter 100 may either stow or deploy.

Furthermore, although the above description is with regard to the gear box 500(3) receiving rotational movement from the cross-drive shaft 404, as alluded to previously, any or all of the corners of the expandable shelter 100 may include the input 502(2) (the "input 502" may be referred to herein as the "input 502(1)"). The input 502(2) may receive rotational movement from a lever or other driver (e.g., knob, wrench, ratchet, crank, drill motor, electric motor, etc.) coupled thereto. For instance, instead of the input 502(1) receiving the rotational movement from the driver, the driver may couple to the input 502(2). In rotating the driver and the input 502(2), the gear box 500(4) may redirect rotational movement about the X-axis into rotational movement about the Y-axis, causing the vertical shaft 208(1) to rotate. The interconnection between the gear box 500(4), the gear box 500(3), the side-drive shaft 206(2), and the cross-drive shaft 404 may transfer rotational movement to the other vertical shafts 208 to cause the expandable shelter 100 to transition between stowed and deployed states (depending on the directional rotation). Therefore, the expandable shelter 100 may deploy or stow through one of the inputs 502 (e.g., the input 502(1) or the input 502(2)) being rotated). With the above discussions in FIGS. 5-7, the vertical posts 208 may respectively receive rotational movement to either stow or deploy the expandable shelter 100.

Example Wall Connection Interface

Figure 8A:
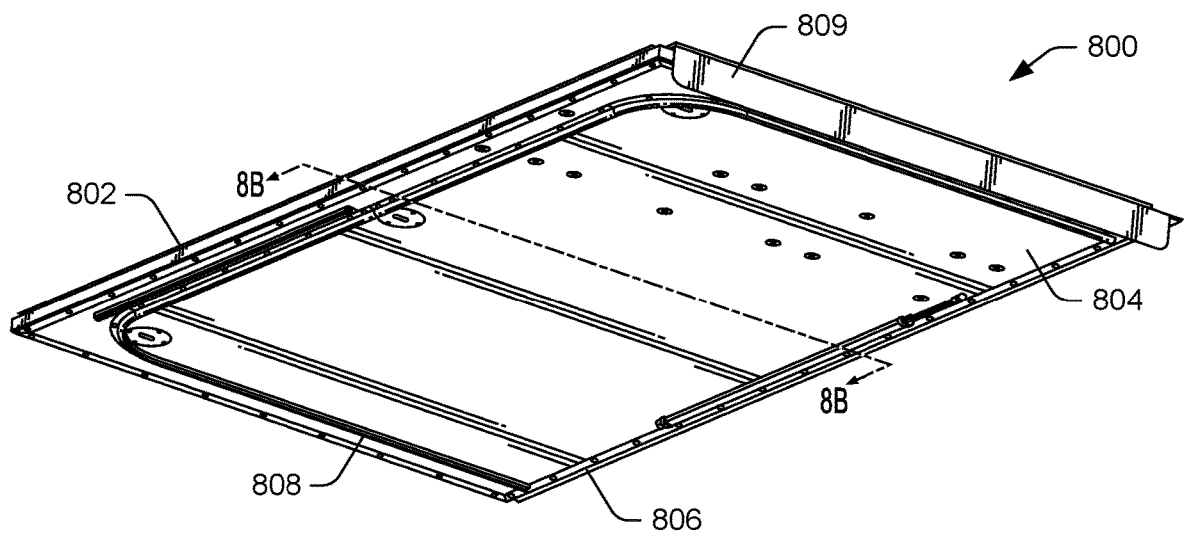
FIG. 8A is a perspective view of an example ceiling panel of an example expandable shelter.
Figure 8B:
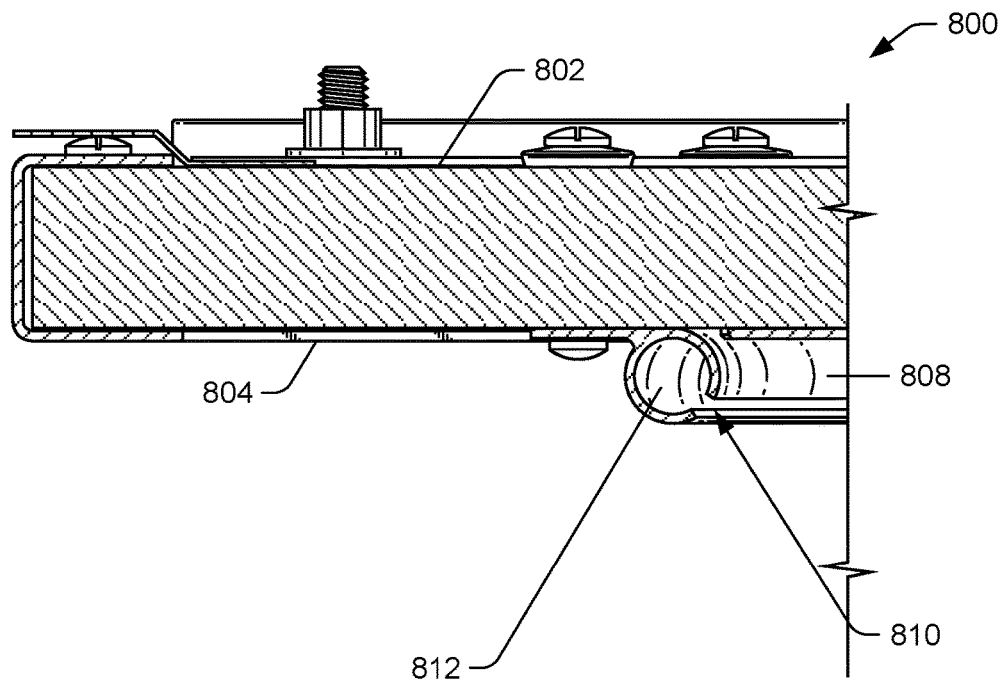
FIG. 8B is a cross-sectional view of the example ceiling panel of FIG. 8A, taken along line 8B-8B of FIG. 8A.

FIGS. 8A and 8B illustrate an example ceiling panel 800 (which may be similar to or represent the "ceiling panel(s) 106"). The ceiling panel 800 may include an exterior surface 802 as well as an interior surface 804 opposite the exterior surface 802. In the stowed state, the exterior surface 802 may represent portions of a lateral exterior of the expandable shelter 100, as shown in FIG. 1A. In the deployed state, the exterior surface 802 may represent portions of a top of the expandable shelter 100, as shown in FIG. 1D. As discussed earlier, the ceiling panel 800 may couple to portions of the upper frame 202, such as the upper frame members 302 via a hinge 806 that allows the ceiling panel 800 to transition between stowed and deployed states.

The ceiling panel 800 includes a channel 808 disposed on the interior surface 804. The channel 808 may follow or traverse portions of a perimeter of the ceiling panel 800. That is, shown in FIG. 8A, the channel 808 is spaced inwardly from the perimeter of the ceiling panel 800 and traverses a curvature of the ceiling panel 800. The channel 808 may therefore be interior to the perimeter of the ceiling panel 800. Discussed below, the channel 808 may receive the exterior wall 122 such that the exterior wall 122 is coupled interior to the exterior perimeter of the ceiling panel 800. The exterior wall 122 may continuously feed through respective channels 808 on the ceiling panels 800. That is, referring to FIG. 1E, the ceiling panels 106 may include the channels 808 that align and/or couple to allow the exterior wall 122 to traverse a perimeter of the expandable shelter 100.

As shown in FIG. 8A, the channel 808 is not disposed on a side of the ceiling panel 800 including the hinge 806. Additionally, although FIG. 8A illustrates the channel 808 following a particular path at a certain offset from the perimeter of the ceiling panel 800, the channel 808 may take any shape, profile, path and be offset any distance from the perimeter of the ceiling panels 800. Additionally, the ceiling panel 800 may include other shapes or may be smaller or larger than shown in FIG. 8A.

The ceiling panel 800 may further include weather seals to environmentally protect the interior 118 of the expandable shelter 100 in the stowed state. The ceiling may also include a flange 809 that engages, retains, or couples to one or more ceiling panels in the stowed state to secure the ceiling panels within the stowed footprint of the expandable shelter 100. For example, in some instances, after the ceiling panel 106(1) and/or the ceiling panel 106(3) are folded in, the ceiling panel 106(2) may retain the ceiling panels 106(1) and 106(3) in the stowed state (e.g., to prevent the ceiling panels 106(1) and 106(3) from opening). Alternatively, in some instances, the ceiling panels 106(1) and 106(3) may retain the ceiling panel 106(2).

FIG. 8B illustrates a partial cross-sectional view of the ceiling panel 800 taken along line 8B-8B of FIG. 8A. FIG. 8B illustrates the channel 808 disposed on the interior surface 804 of the ceiling panel 800. The channel 808 includes a slot 810 and an interior 812. The slot 810 allows a bead or piping at a top edge of the exterior wall 122 to feed through the channel 808 and around the perimeter of the expandable shelter 100. A fastener, such as a bead or piping at a top edge of the exterior wall 122 is disposed within the interior 812 of the channel 808 to couple the exterior wall 122 to the channel 808.

FIG. 8B also illustrates that the ceiling panel 800 may comprise a SIP having at least a layer of insulation material sandwiched between two outer skins made of structural material.

Figure 9:
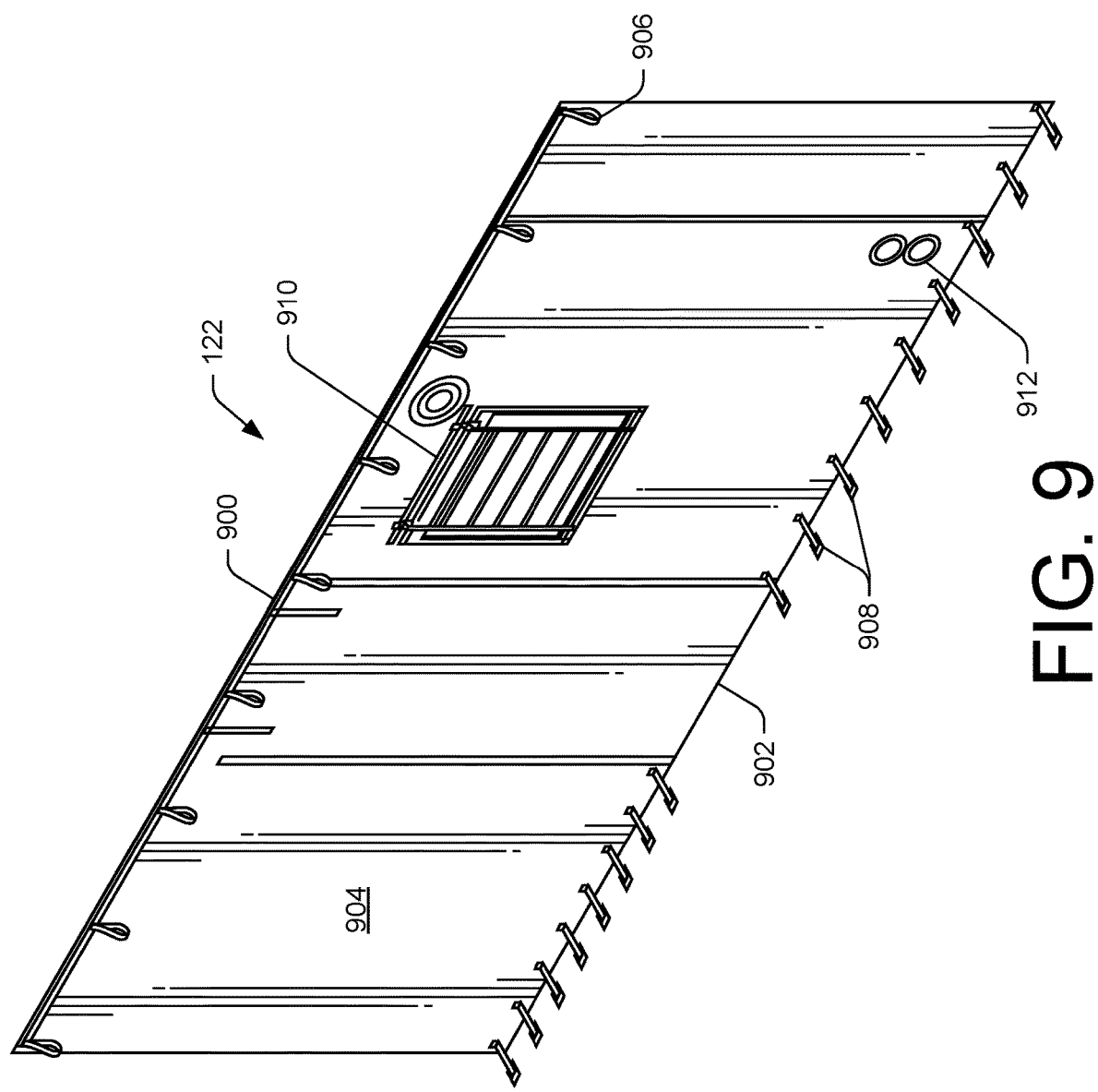
FIG. 9 is a perspective view of an example wall of an example expandable shelter.

FIG. 9 illustrates a perspective view of an example exterior wall 122. The exterior wall 122 may include a top 900, a bottom 902, and a wall 904 extending between the top 900 and the bottom 902. Disposed at the top 900, the exterior wall 122 may include straps or handles 906 to maneuver, position, or handle the exterior wall 122, and a bead, piping, or other fastener (too small to see in FIG. 9, but illustrated and described in FIGS. 10A and 10B) to secure the exterior wall 122 to one or more ceiling panels 800. Disposed at the bottom 902, the exterior wall 122 may include tie-downs 908 that couple the exterior wall 122 to the expandable shelter 100. For instance, the tie-downs 908 may engage with straps and through a tightening of the tie-downs 908, the exterior wall 122 may enclose the interior 118 of the expandable shelter.

In some instances, the tie-downs 908 may couple to the exterior wall 122 through fasteners (e.g., hooks, loops, slots, etc.) or being directly integrated with the exterior wall 122 (e.g., sewn, riveted, screwed, etc.).

The wall 904 portion of the exterior wall 122 may include a window 910 or other openings 912 to provide access between an exterior of the expandable shelter 100 and the interior 118 of the expandable shelter 100. The window 910 and/or the openings 912 may be capable of closing to limit debris entering the expandable shelter 100, to limit visibility into the interior 118 of the expandable shelter 100, and/or to limit light exiting the expandable shelter 100.

The exterior wall 122 may be flexible to allow the exterior wall 122 to traverse the channel 808 and enclose the interior 118 (see FIG. 1E). In some instances, the exterior wall 122 may be a single piece of material or different sections of material may be fastened together to form the exterior wall 122 (e.g., buckled, sewn, hook and loop elements such as Velcro®, clamps, zippers, etc.). Additionally, as the expandable shelter 100 may reside in extreme or harsh environments, materials of the exterior wall 122 may be capable of withstanding wind, rain, hail, and/or debris and resist tears, punctures, ruptures, or splitting. The exterior wall 122 may also include water-resistant materials (e.g., nylon, polyester, etc.), water-proof materials (e.g., Gore-Tex®, vinyl, etc.), rubbers, fabrics, projectile resistant materials (e.g., woven or non-woven synthetic materials such as Kevlar™, Twaron™, Dyneema™ etc.), or any combination thereof. Furthermore, the exterior wall 122 may include materials to thermally insulate the interior 118 of the expandable shelter 100. When not deployed, the exterior wall 122 may compactly fold or collapse.

Figure 10A:
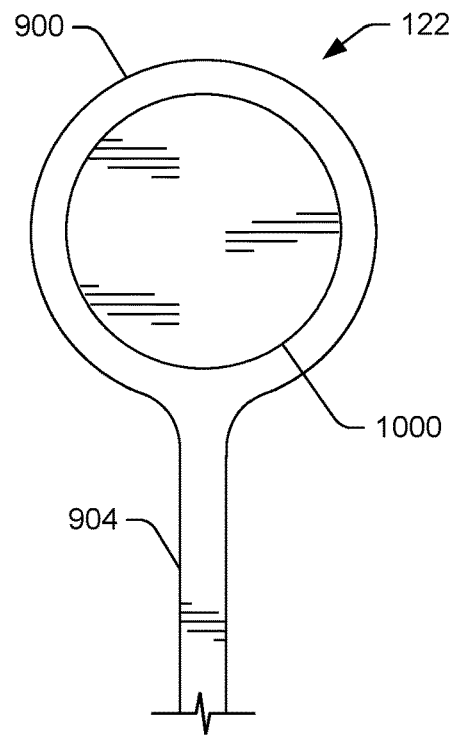
FIG. 10A is a side view of the example wall of FIG. 9.

FIG. 10A illustrates a side view of the top 900 of the exterior wall 122. At the top 900 of the exterior wall 122, or substantially at the top 900 of the exterior wall 122, may be a fastener 1000 sized and configured to be insertable within the channel 808. For instance, the fastener 1000 may comprise a bead or piping that is configured to feed through the channel 808 and around the perimeter of the expandable shelter 100. The wall 904 portion of the exterior wall 122 may be sewn around the fastener 1000 such that the fastener 1000 is disposed within the wall 904.

Additionally, or alternatively, the fastener 1000 may include slides, clasps, hooks, loops, buttons, and so forth. In some instances, the fastener 1000 may include a boltrope sewn, integrated, or coupled to the exterior wall 122. In such instances, the boltrope may be made of metal, fabric, or plastics capable of bending to allow the exterior wall 122 to follow a curvature of the channel 808.

Figure 10B:
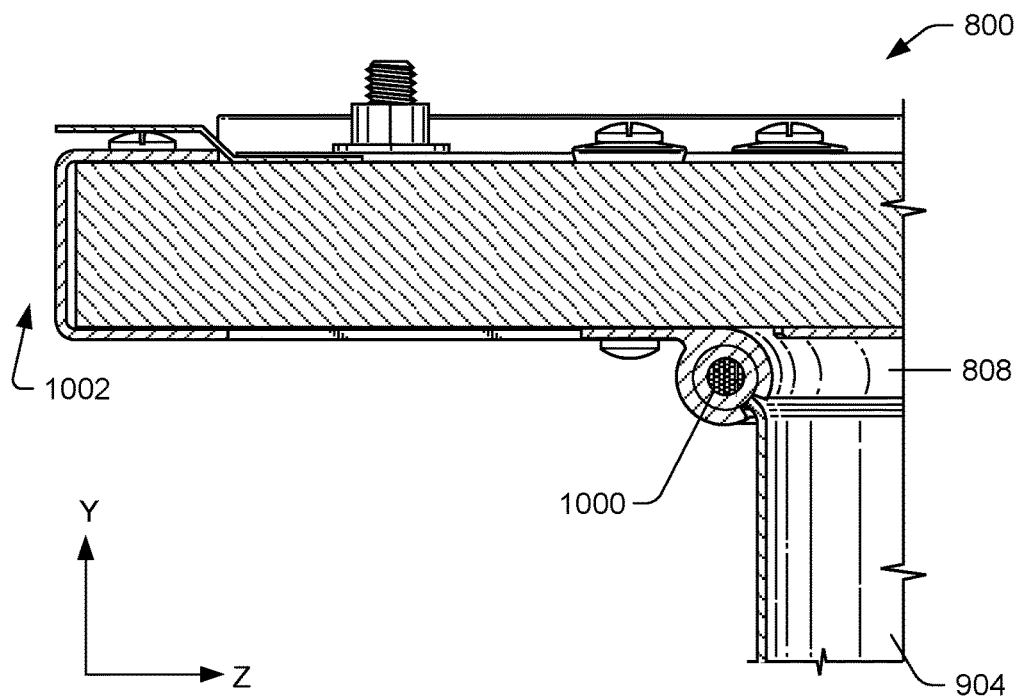
FIG. 10B is a cross-sectional view the example ceiling panel of FIG. 8A, showing the example wall of FIG. 9 coupled to the example ceiling panel.

FIG. 10B illustrates a cross-sectional view of the ceiling panel 800 similar to that shown in FIG. 8. However, shown in FIG. 10B, the exterior wall 122 is coupled to the ceiling panel 800 via the fastener 1000 and the wall 904 engaging with the channel 808. Specifically, the fastener 1000 is shown disposed within the interior 812 of the channel 808. Additionally, when inserted into the channel 808, the wall 904 is disposed through the slot 810 in the channel 808 in order to drape downward in the Y-direction, toward the floor panels 110. As shown in FIG. 10B, the exterior wall 122 couples to the ceiling panel 800 interior to an outer perimeter 1002 of the ceiling panel 808, thereby preventing water from entering the interior 118 of the expandable shelter 100.

In some instances, the exterior wall 122 may couple to the ceiling panel 800 in the deployed state, while in other instances, the exterior wall 122 may be configured to fold within the ceiling panels 800 (or the floor panels) in the stowed state.

While examples describe the exterior wall 122 coupling to the ceiling panel 800 through use of the channel 808, in some instances, the exterior wall 122 may otherwise be coupled. For instance, the exterior wall 122 may couple to the ceiling panel 800 using zippers, hooks, buttons, straps, clamps, hook and loop (e.g., Velcro®), magnets, or any combination thereof.

Figure 11A:
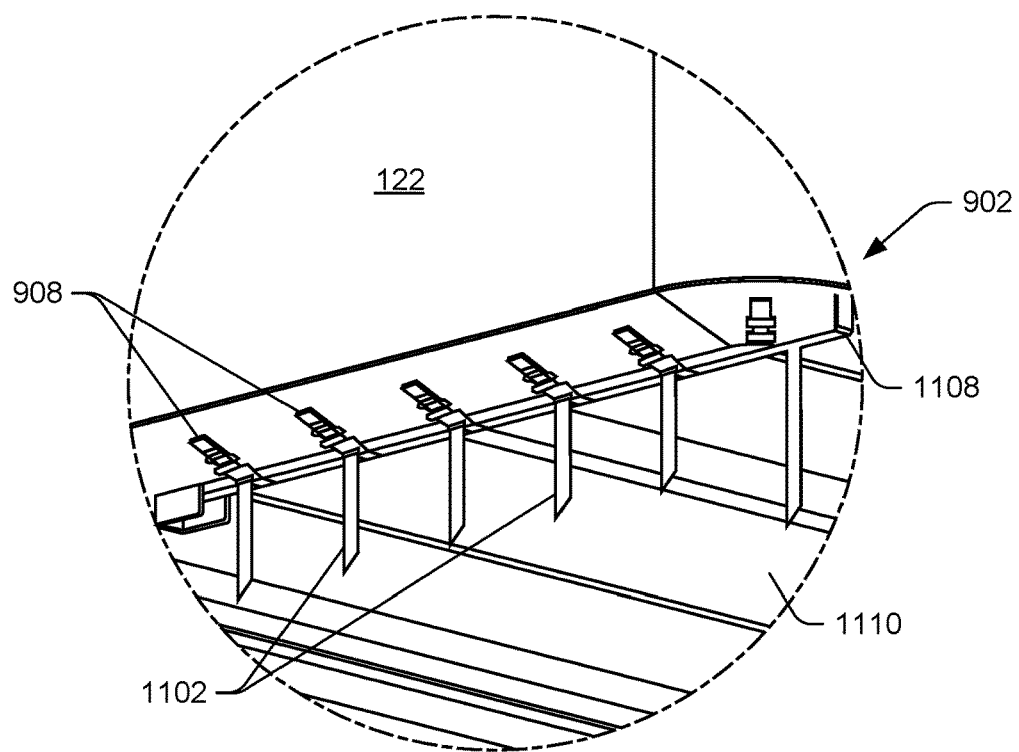
FIG. 11A is a perspective view of the bottom of the example wall of FIG. 9, showing the example wall coupled to an expandable shelter.
Figure 11B:
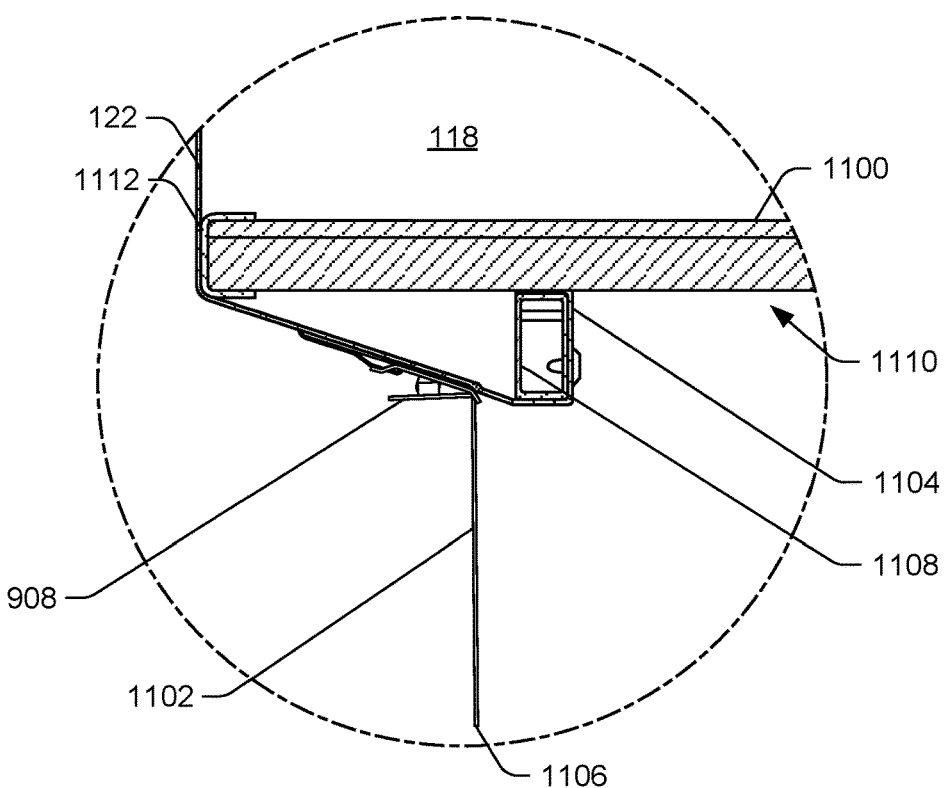
FIG. 11B is a cross-sectional view of the bottom of the example wall of FIG. 9, showing the example wall coupled to the expandable shelter.

FIGS. 11A and 11B illustrate the coupling of the exterior wall 122 to the expandable shelter 100, and more particularly, the coupling of the bottom 902 of the exterior wall 122 to a floor panel 1100 (which may represent or be similar to the floor panels 110) through use of the tie-downs 908. The tie-downs 908 engage with straps 1102 coupled to the floor 1100 or other portions of the expandable shelter 100. For instance, the straps 1102 may include a first end 1104 coupled to floor panel 1100 and a second end 1106 that feeds through respective tie-downs 908. After being inserted into the tie-downs 908, the second end 1106 may be pulled to make the exterior wall 122 taut through binding the strap 1102 within the tie-down 908. For example, FIG. 11B illustrates the second end 1106 hanging through the tie-down 908 after being pulled tight. The tie-downs 908 may include mechanisms (e.g., cam or ratchet) that prevent the straps 1102 from loosening.

The exterior wall 122 may include any number of tie-downs 908 and a corresponding number of straps 1102 may also be included. In some instances, the straps 1102 may individually couple to the floor panel 1100 at the first end 1104 or may couple to one or more bars 1108 on the underneath side 1110 of the floor panel 1100. The inclusion of the one or more bars 1108 may reduce a number of fasteners disposed into the floor panel 1100 to secure the straps 1102.

Although the tie-downs 908 and the straps are shown coupled to the exterior wall 122 and the floor panel 1100, respectively, in some instances the exterior wall 122 may include the straps 1102 while the tie-downs 908 are coupled to the floor panels. Alternatively, a combination of tie-downs 908 and straps 1102 may be disposed on the exterior wall 122 and the floor panel 1100, respectively.

Shown in FIG. 11B, the exterior wall 122 may wrap over a perimeter 1112 of the floor panel 1100 in the deployed state. An end of the exterior wall 122 may wrap beneath the underneath side 1100 of the floor panel 110. As such, rain, snow, or other debris may shed away from the interior 118. In some instances, the perimeter 1002 of the ceiling panel 800 may align with the perimeter 1112 of the floor panel 1100. Alternatively, the perimeter 1112 of the floor panel 1100 may be disposed interior or exterior relative to the perimeter 1102 of the ceiling panel 800.

Example Appliance/Object Anchor System

Figure 12:
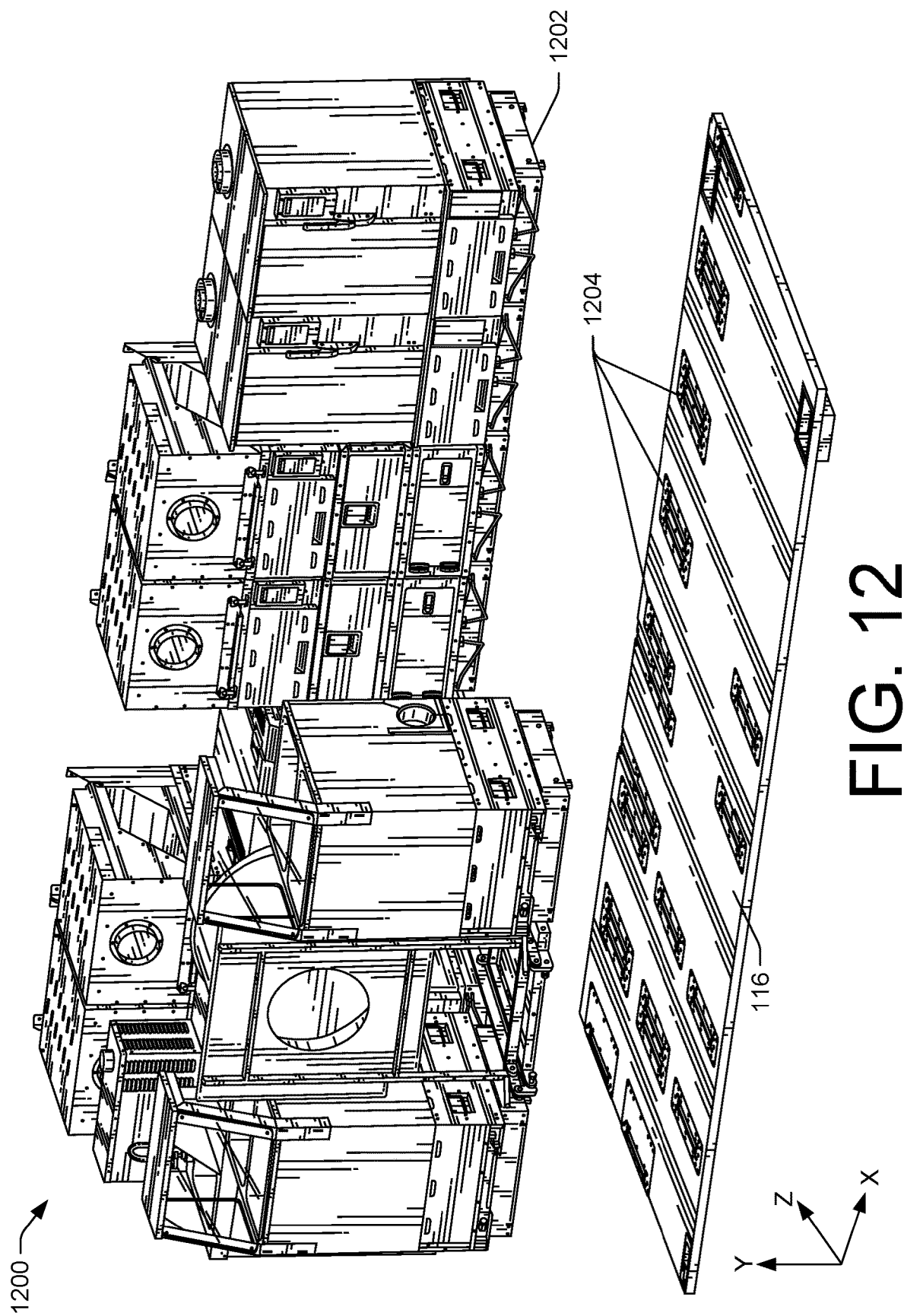
FIG. 12 is a perspective view of example appliances and an example floor of an example expandable shelter, showing the example appliances disposed above the example floor.

FIG. 12 illustrates the floor 116 of the expandable shelter 100 and a plurality of appliances 1200. The appliances 1200 are shown being disposed above the floor 116 in the Y-direction to illustrate features of the floor 116 and mechanisms to couple the appliances 1200 to the floor 116. The appliances 1200 may operably couple to the floor 116 during transport of the expandable shelter 100 and/or after deployment of the expandable shelter 100, for instance.

The appliances 1200 may couple to the floor 116 through a carrier 1202. The carrier 1202 may be sized and shaped for respective appliances 1200 or other objects. For instance, as the appliances 1200 may come in different shapes and sizes, respective carriers 1202 may be appropriately sized and configured according to the appliance 1200. Alternatively, the carriers 1202 may be uniformly sized and configured to mount to appliances 1200 of varying sizes, or the carriers 1202 may be adjustable to match a size of a respective appliance 1200. The appliances 1200 may couple to the respective carriers 1202 through fasteners or in some instances, the carriers 1202 and the appliances 1200 may be integrated with one another. In this sense, the appliance 1200 may be built into the carrier 1202 (or vice versa) or the appliance 1200 may couple to the carrier 1202 aftermarket.

The floor 116 may include a plurality of tracks 1204 or other mounting features that engage with the carrier 1202. The tracks 1204 may be appropriately positioned along the floor 116 to receive the carrier 1202 and according to a layout of the appliances 1200. The tracks 1204 may be integrated within the floor 116 or coupled thereto. The carrier 1202 and the tracks 1204 are discussed in turn.

Figure 13:
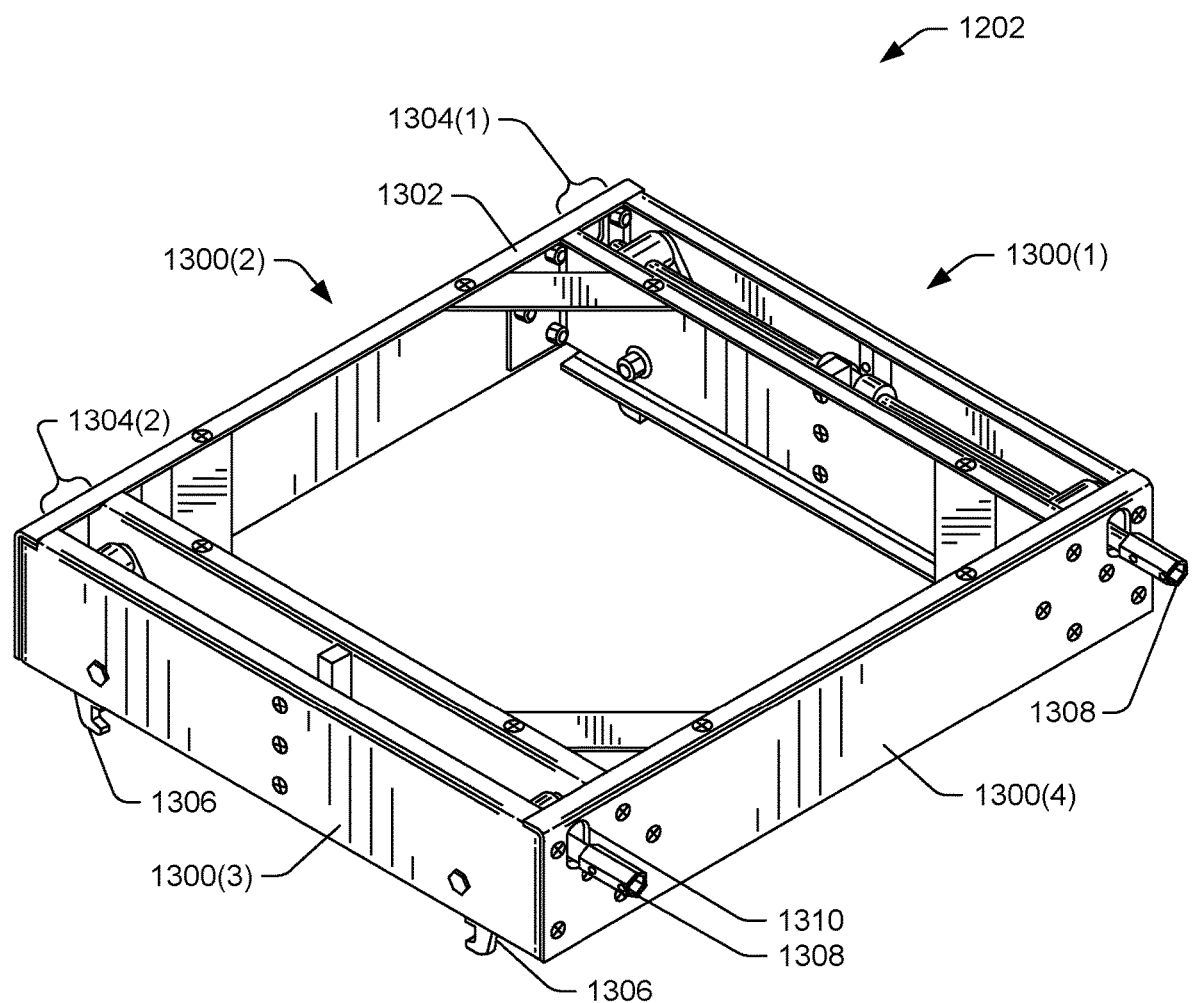
FIG. 13 is a perspective view of an example carrier.
Figure 13:
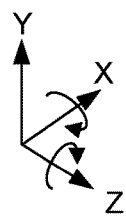

FIG. 13 illustrates a perspective view of the carrier 1202. In some instances, the carrier 1202 may include sides 1300(1), 1300(2), 1300(3), and 1300(4) (hereinafter, collectively "sides 1300"). The sides 1300 define a perimeter of the carrier 1202, which in some instances, may correspond to a size and shape of the appliance 1200 coupled to the carrier 1202. The appliance 1200 may couple to a top surface 1302 of the carrier 1202 through fasteners (e.g., screws, bolts, etc.) or the appliance 1200. The carrier 1202 may be made of suitable materials to support the weight of the appliances 1200, such as metals (e.g., aluminum, steel, iron, stainless steel, titanium, magnesium, etc.), composites (e.g., fiberglass, carbon fiber, etc.), plastic, wood, or any combination thereof. Gussets, supports, or other members may also be included to increase a structural strength of the carrier 1202.

The carrier 1202 may include a wheel well 1304(1) and a wheel well 1304(2) (hereinafter, collectively "wheel wells 1304"). The wheel wells 1304 may be disposed within the perimeter of the carrier 1202. Discussed herein, the wheel wells 1304 may be sized to respectively receive a wheel assembly that permits the carrier 1202 to move about the floor 116 and couple to the floor 116. For instance, the carrier 1202 may include attachment or clamping mechanisms 1306 (collectively referred to as "clamping mechanisms 1306" or singularly, "clamping mechanism 1306") that couple the carrier 1202 to the floor 116. The clamping mechanisms 1306 may transition between clamped and unclamped states, so as to either couple or permit the carrier 1202 to move about the floor 116, respectively. The clamping mechanisms 1306 may clamp and unclamp through an operation of a rod or shaft 1308, for example (e.g., threaded rod). For instance, rotation of the shaft 1308 about the Z-axis may cause the clamping mechanisms 1306 to rotate about the X-axis (discussed in detail herein), therein coupling or uncoupling with the tracks 1204 in the floor 116 (either through clockwise or counter clockwise rotational movement). Respective wheel assemblies may include respective clamping mechanisms 1306 and a respective shaft 1308 to couple both sides of the carrier 1202 to the floor 116.

In some instances, the shaft 1308 may protrude through an opening 1310 in the carrier 1202, exterior to the perimeter of the carrier 1202. Alternatively, the shafts 1308 may be disposed interior to the perimeter of the carrier 1202 and the opening 1310 may provide access to the shaft 1308. The shaft 1308 may also include a socket, actuator, or handle to receive the rotational movement.

Figure 14B:
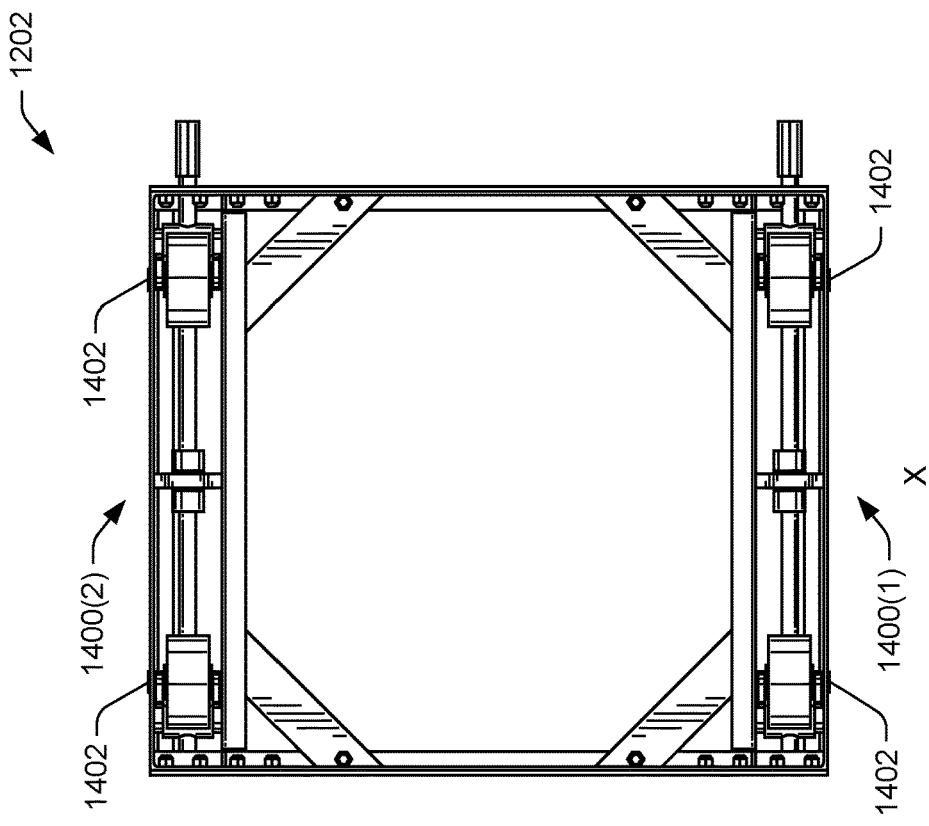
FIG. 14B is a bottom view of the example carrier of FIG. 13.
Figure 14A:
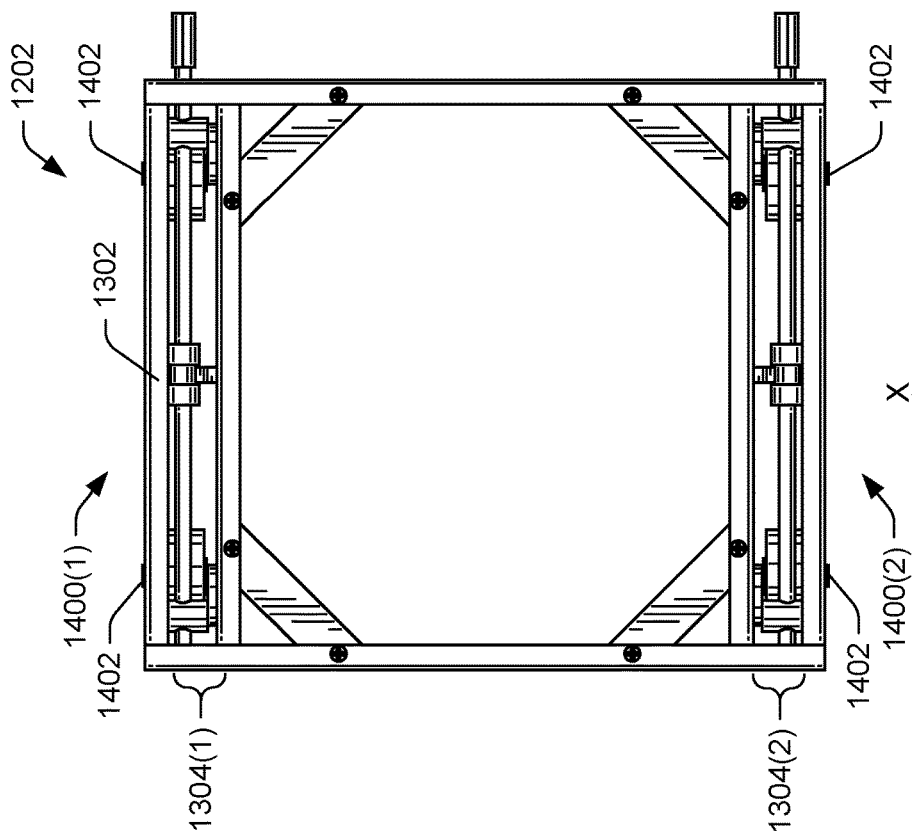
FIG. 14A is a top view of the example carrier of FIG. 13 for securing an appliance or other object to a surface such as a floor of the example expandable shelter.

FIGS. 14A and 14B illustrate top and bottom views of the carrier 1202, respectively. In both FIGS. 14A and 14B, a wheel assembly 1400(1) is shown residing within the wheel well 1304(1) and a wheel assembly 1400(2) is shown residing within the wheel well 1304(2) (hereinafter, collectively "wheel assemblies 1400" or singularly "wheel assembly 1400"). The wheel assemblies 1400 may couple to the carrier 1202 through fasteners 1402.

Figure 15A:
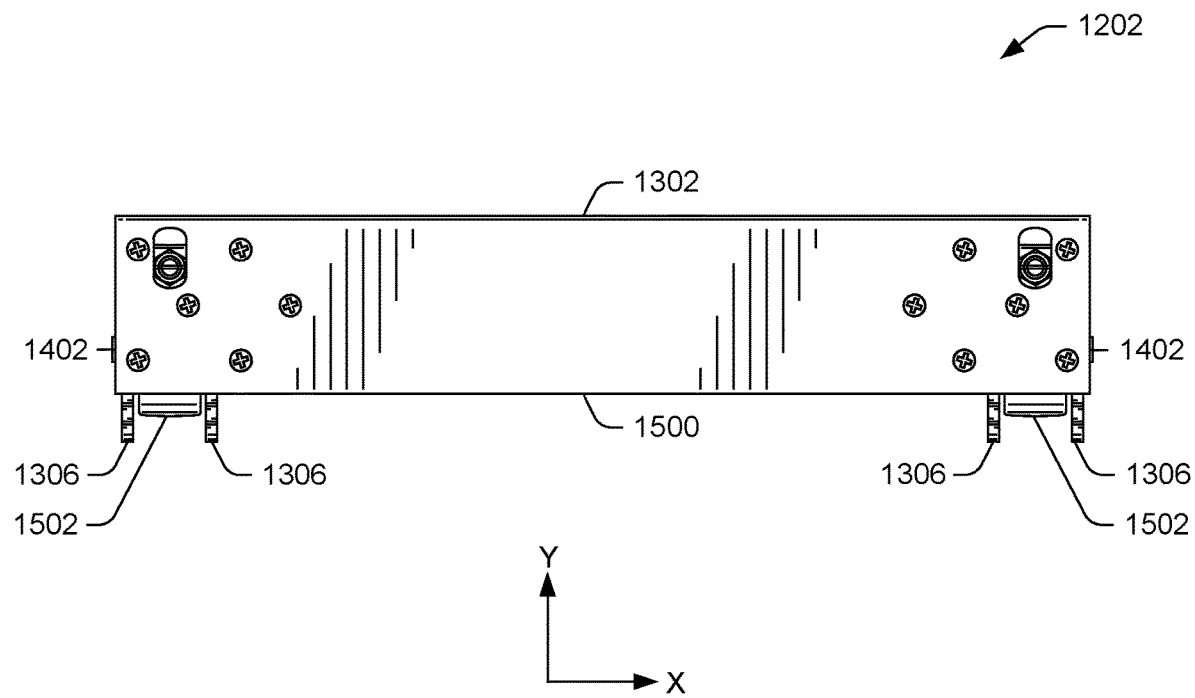
FIG. 15A is a front view of the example carrier of FIG. 13.
Figure 15B:
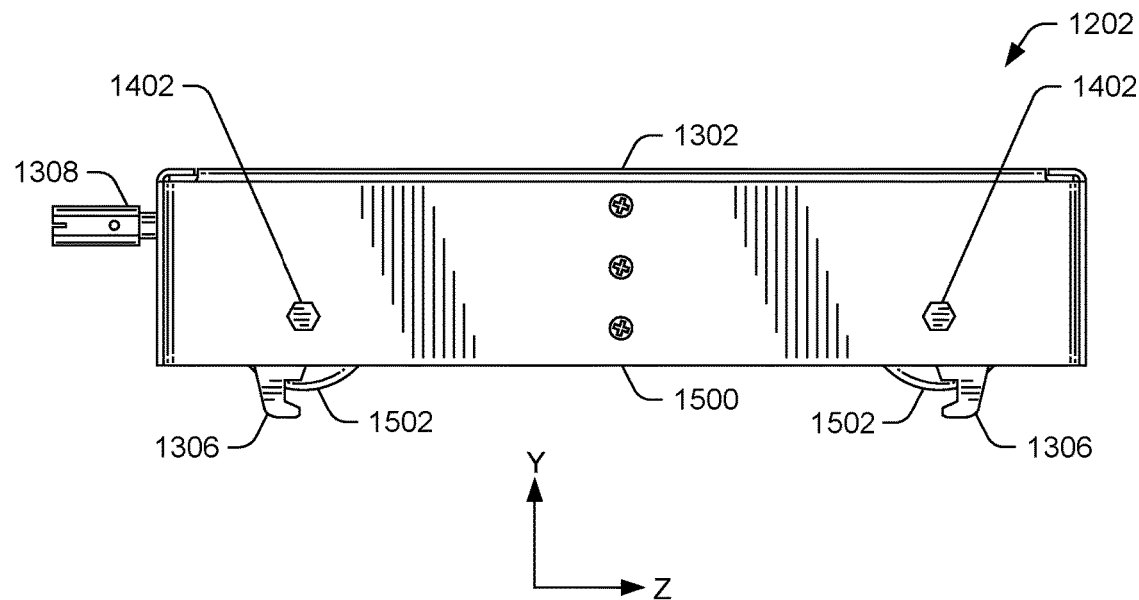
FIG. 15B is a side view of the example carrier of FIG. 13.

FIGS. 15A and 15B illustrate front and side views of the carrier 1202, respectively. Shows in both FIGS. 14A and 14B, the carrier 1202 includes a bottom surface 1500 disposed in the Y-direction from the top surface 1302. The carrier 1202 includes wheels 1502 (individually, "wheel 1502") disposed beneath the bottom surface 1500 of the carrier 1202. That is, in this example, to permit the carrier 1202 to move, the wheels 1502 are disposed beneath a X-Z plane of the bottom surface 1500 of the carrier 1202.

Disposed on either side of the wheel 1502 is the clamping mechanism 1306. A first clamping mechanism 1306 is disposed on a first side of the wheel 1502 while a second clamping mechanism 1306 is disposed on a second side of the wheel 1502. To couple the clamping mechanisms 1306 and the wheels 1502 to the carrier 1202, the fasteners 1402 may be disposed through the clamping mechanisms 1306 and the wheel 1502. The fasteners 1402 may function as axles about which the wheels 1502 rotate.

Figure 16:
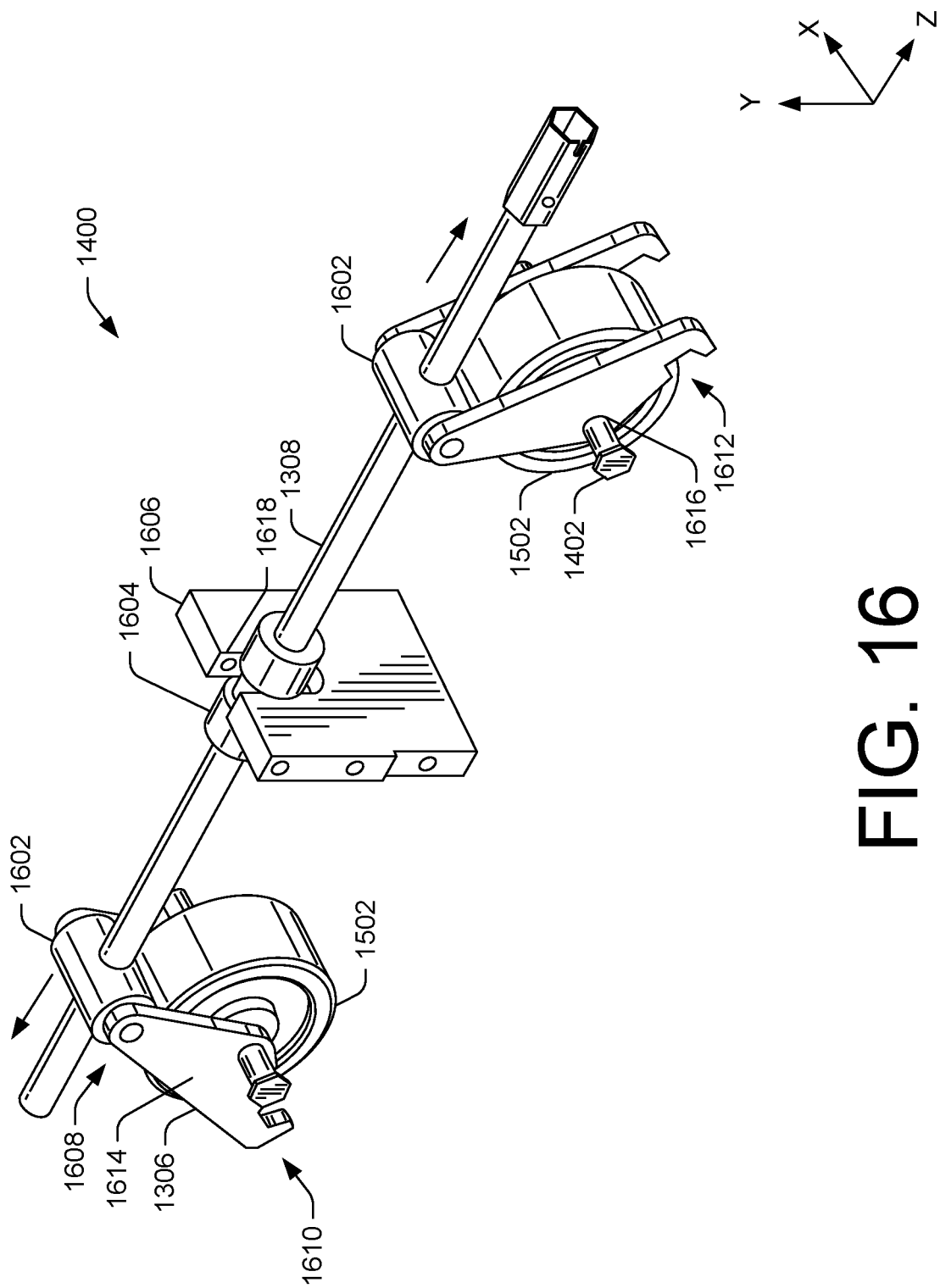
FIG. 16 is a perspective view of an example wheel assembly of the example carrier of FIG. 13.

FIG. 16 illustrates a wheel assembly 1400 of the carrier 1202. The wheel assembly 1400 may include the clamping mechanisms 1306, the shaft 1308, the fasteners 1402, and the wheels 1502. The wheel assembly 1400 may also include trunnion nuts 1602 that engage with the shaft 1308. In some instances, the wheel assembly 1400 may further include a coupler 1604 and a coupler support 1606.

The clamping mechanisms 1306 may include a first end 1608 and a second end 1610. The first end 1608 may operably couple to a respective trunnion nut 1602. For instance, the first end 1608 may operably couple to the trunnion nut 1602 through protrusions on the trunnion nut 1602 that engage with openings at the first end 1608 of the clamping mechanism 1306. Alternatively, the first end 1608 may include protrusions that engage with holes in the trunnion nut 1602. The second end 1610 may include attachment mechanisms (e.g., tabs, surfaces, hooks, protrusions, etc.) that clamp, attach, secure, or couple the wheel assembly 1400 to the floor 116. For instance, FIG. 16 illustrates that the second end 1610 may include a hook 1612.

Between the first end 1608 and the second end 1610 may be a body 1614 of the clamping mechanism 1306. The body 1614 includes a hole 1616 through which the fastener 1402 is disposed to couple the wheel assembly 1400 to the carrier 1202.

FIG. 16 illustrates that the clamping mechanisms 1306 are disposed on both sides of the wheels 1502. Thus, the clamping mechanisms 1306 may function as a hub for the wheel 1502 while the fastener 1402 serves as the axle about which the wheels 1502 rotate.

As noted above, the wheel wells 1304 may include the wheel assembly 1400 and the wheel assembly 1400 may allow the carrier 1202 to transition between clamped and unclamped states. To illustrate, the shaft 1308 may include threads that engage with the trunnion nuts 1602. As the trunnion nuts 1602 are coupled to respective clamping mechanisms 1306 at the first ends 1608, and being that the clamping mechanisms 1306 are coupled to the carrier 1202 via the fasteners 1402, a rotation of the shaft 1308 may cause the clamping mechanisms 1306 to move. That is, a rotation of the shaft 1308 about the Z-axis causes the trunnion nuts 1602 to experience lateral movement in the Z-direction (as shown via the arrows). Rotation, may come by way of a a lever, wrench, ratchet, crank, electric motor, drill motor, or other driver. Through an operation of the driver, the clamping mechanisms 1306 may rotate about the fastener 1402 in the X-direction, moving the hook 1612 inward or outward in the Z-direction (depending on the rotational direction of the shaft 1308). Shown herein in FIGS. 19A and 19B, through the movement of the clamping mechanisms 1306, the hook 1612 may engage with portions of the floor 116, such the tracks 1204 coupled to the floor 116. In some instances, the hooks 1612 of the clamping mechanisms 1306 may engage with surfaces of the tracks 1204 to couple the carrier 1202 to the floor 116.

The portions of the shaft 1308 that engage with the trunnion nuts 1602 may include opposite, or reverse threads compared to one another. That is, with the different directional threads, the rotation of the shaft 1308 about the Z-axis may cause one of the trunnion nuts 1602 to experience movement in a positive Z-direction, while another of the trunnion nuts 1602 may experience movement in a negative Z-direction. The hooks 1612 of the clamping mechanisms 1306 may therefore be brought inward from their position shown in FIG. 16. However, while FIG. 16 illustrates the hooks 1612 disposed in a particular direction, the hooks 1612 may be disposed at other directions as well. For instance, the hooks 1612 may face outward, away from one another, or in some instances, the hooks 1612 of the clamping mechanisms 1306 may be disposed in the same direction. In such instances, the threads on the shaft 1308 may be appropriately threaded to clamp and/or unclamp the carrier 1202.

In some instances, moving the hooks 1612 outwards (or when transitioning to the unclamped state) may decrease a distance between the trunnion nuts 1602, while moving the hooks inwards (or when transitioning to the clamped state) may increase a distance between the trunnion nuts 1602. Given this interaction, the shaft 1308 may vertically move in the Y-direction depending on the rotation of the shaft 1308. For example, when transitioning to the unclamped state, the distance between the trunnion nuts 1602 may decrease and the shaft may lower in the Y-direction. The coupler 1604 may slide within a groove 1618 of the coupler support 1606 to permit such movement. Conversely, when transitioning to the clamped state, the distance between the trunnion nuts 1602 may increase and the shaft 1308 may rise in the Y-direction. Accordingly, the coupler 1604 may vertically slide within the groove 1618. Further, the carrier 1202 may include corresponding holes or slots to permit the shaft 1308 to vertically position during unclamping and clamping. In some instances, depending on the disposition or orientation of the hooks 1612, the shaft 1308 may include corresponding right-hand and/or left-hand threads.

Furthermore, in some instances, being as the distance between the trunnion nuts 1602 decrease in the unclamped state, the shaft 1308 may contact the wheels 1502 and serve as a brake. In some instances, the shaft 1308 may include enough travel to permit such contact. For example, as the trunnion nuts 1602 travel inwards (e.g., towards the coupler support 1606), there comes an instance where the shaft 1308 may contact a top of the wheels 1502, respectively. Here, continuing to unclamp the clamping mechanisms 1306 (e.g., clockwise rotation about the Z-axis) may force the shaft 1308 into contact with the wheel 1502, thereby serving as a brake and preventing the wheels 1502 from moving. However, through an opposite rotation (e.g., counter clockwise rotation about the Z-axis) may release the shaft 1308 from contact with the wheels 1502 and permit the carrier 1202 to reposition.

Noted above, in some instances, the wheel assembly 1400 may include the coupler 1604 and the coupler support 1606 having the groove 1618 that engages with a slot of the coupler support 1606. The coupler support 1606 may couple to the carrier 1202 through fasteners. When included, the coupler 1604 and the coupler support 1606 may prevent a buckling of the of the shaft 1308 when rotated.

Figure 17A:
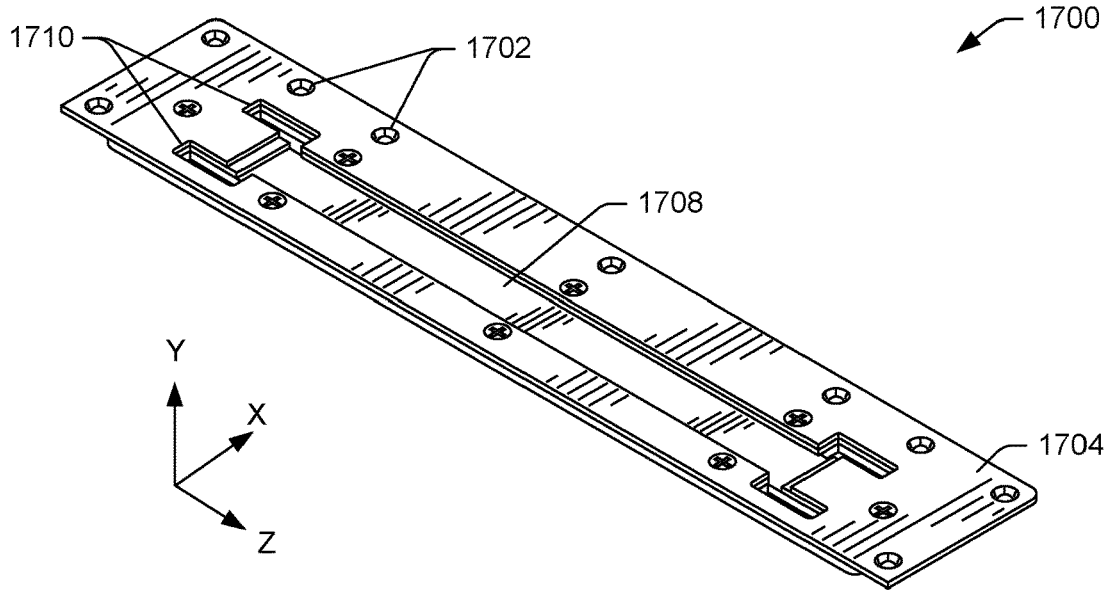
FIG. 17A is a perspective view of an example track to which the example carrier of FIG. 13 can be secured to couple an appliance or other object to a surface such as a floor of an example expandable shelter.
Figure 17B:
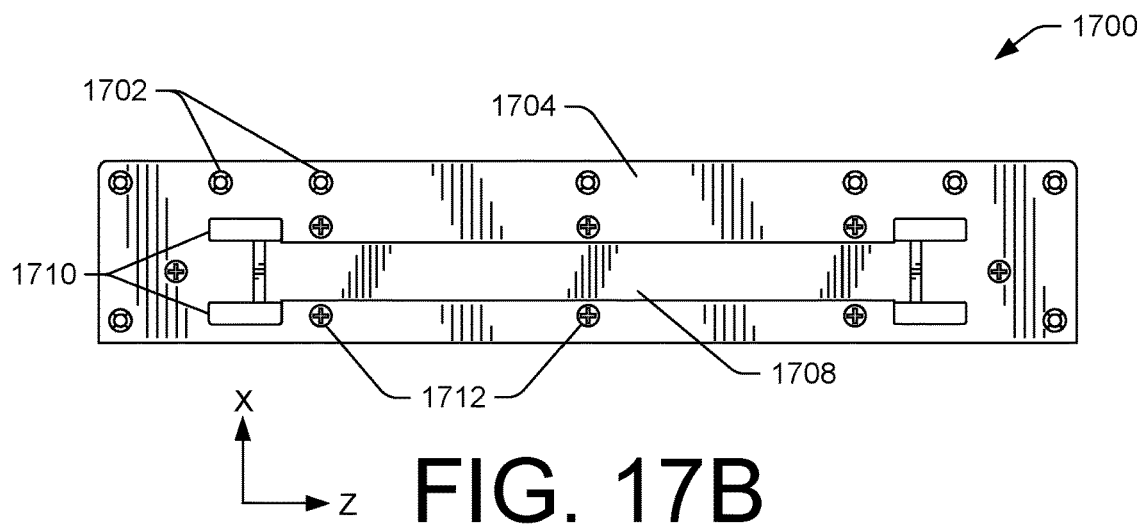
FIG. 17B is a top view of the example track of FIG. 17A.
Figure 17C:
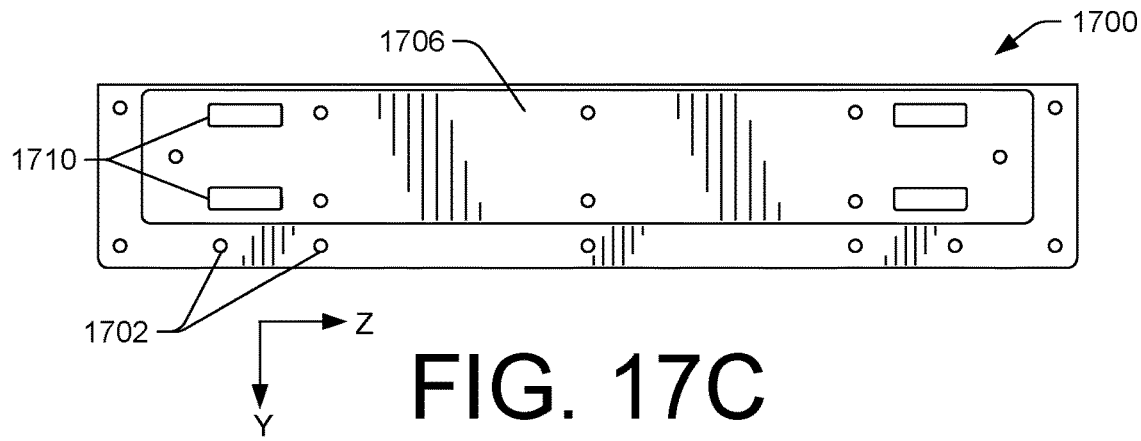
FIG. 17C is a bottom view of the example track of FIG. 17A.

FIGS. 17A, 17B, and 17C illustrate an example track 1700 (which may be similar to or represent the "track 1204"). Particularly, FIG. 17A illustrates a perspective view of the track 1700, FIG. 17B illustrates a top view of the track 1700, and FIG. 17C illustrates a bottom view of the track 1700. The track 1700 may couple to the floor 116 of the expandable shelter 100 through fasteners disposed through holes 1702 in the track 1700. Discussed herein, the track 1700 may receive the carrier 1202, and particularly, the wheel assemblies 1400 of the carrier 1202.

The track 1700 includes a top surface 1704 and a bottom surface 1706. In some instances, the top surface 1704 may align flush with a surface of the floor 116, thereby creating a level surface within the interior 118 of the expandable shelter 100. In some instances, the track 1700 may reside within a slot on the floor 116 such that the top surface 1704 aligns flush with the floor 116.

The track 1700 may include a trough, channel, or groove 1708 disposed beneath the top surface 1704. The groove 1708 may be spaced apart in the Y-direction from a X-Z plane of the top surface 1704. The groove 1708 may have a length sized and width sized to receive the wheels 1502 of the wheel assembly 1400. More particularly, a length of the groove 1708 (Z-direction) may be sized such that the wheels 1502 reside within ends of the groove 1708. As such, the wheel assembly 1400 may be prevented from rolling out of the groove 1708. Additionally, a width of the groove 1708 (X-direction) may be sized to receive a width of the wheels 1502.

Disposed at the ends of the groove 1708 may be slots 1710. Discussed in detail herein, the slots 1710 may be attachment mechanisms that receive the clamping mechanisms 1306, and specifically the hooks 1612, of the wheel assembly 1400. For instance, respective slots 1710 may be sized to receive respective hooks 1612, and when the clamping mechanism 1306 are actuated (through a rotation of the shaft 1308), the hooks 1612 may engage with the bottom surface 1706 of the track 1700. As such, the engagement between the hooks 1612 and the bottom surface 1706 may couple the carrier 1202 to the track 1700. To allow the hook 1612 to engage with the bottom surface 1706, a gap may be disposed between the bottom surface 1706 of the track 1700 and portions of the floor 116 within which the track 1700 resides, for instance.

In some instances, the track 1700 may be formed through stacking panels or plates upon one another or the track 1700 may be formed of a single piece of material. For instance, FIG. 17A illustrates that the groove 1708 may be formed through coupling multiple plates upon one another, where respective plates include portions of the groove 1708. The plates may couple together using fasteners 1712 (e.g., screws, bolts, rivets, etc.) to form the track 1700.

Figure 18:
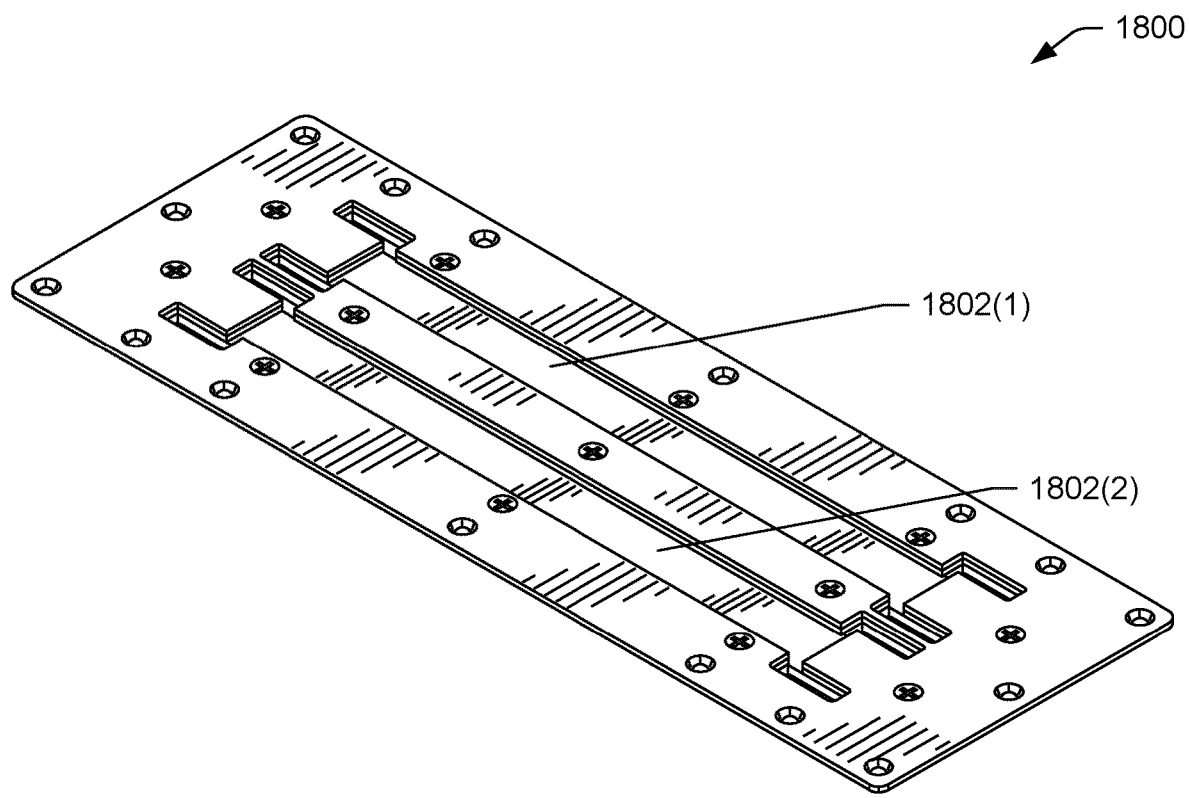
FIG. 18 is a perspective view of an example track of an example expandable shelter.

FIG. 18 illustrates a perspective view of an example track 1800 (which may be similar to or represent the "track 1204"). Compared to the track 1700, the track 1800 may include multiple grooves and corresponding slots. That is, FIG. 18 illustrates that multiple grooves and slots may be included within a single track. For instance, the track may include a first groove 1802(1) and a second groove 1802(2) (hereinafter, collectively "grooves 1802"). Each of the grooves 1802 may receive a respective wheel assembly 1400. In some instances, the track 1800 may include similar features as the track 1700, such as holes to secure the track 1800 to the floor 116.

Returning briefly to FIG. 12, and in combination with the discussion of the track 1700 and the track 1800, the floor 116 may include a plurality of tracks positioned to receive the carriers 1202. Accordingly, the expandable shelter 100 may include different layouts or configurations of appliances 1200 on the floor 116.

FIGS. 19A and 19B illustrate clamping and unclamping of the carrier 1202 to the track 1700. Particularly, FIG. 19A illustrates the carrier 1202 in an unclamped state while FIG. 19B illustrates the carrier 1202 in a clamped state. Additionally, although FIGS. 19A and 19B illustrate the carrier 1202 unclamped and clamped to the track 1700, the carrier 1202 may similarly unclamp and clamp to other tracks, such as the track 1800.

Beginning with FIG. 19A, the carrier 1202 is shown on/within the track 1700 and the wheels 1502 residing within the groove 1708. In the unclamped state, the hooks 1612 of the clamping mechanisms 1306 are disposed above an X-Z plane defining the top surface 1704 of the track 1700 to allow the carrier 1202 to wheel into the track 1700. The wheels 1502 of the carrier 1202 may reside within ends of the groove 1708 to position the carrier 1202 within the track 1700. In some instances, the positioning of the carrier 1202 between the ends of the groove 1708 aligns the clamping mechanisms 1306 with the slots 1710.

From the illustration shown in FIG. 19A, the clamping mechanisms 1306 may rotate to couple the carrier 1202 with the track 1700. The clamping mechanisms 1306 may rotate about the fasteners 1204 (X-axis) through a rotation of the shaft 1308 about the Z-axis. In doing so, shown in FIG. 19B, the hooks 1612 engage with the track 1700 through the hooks 1612 coupling to the bottom surface 1706 of the track 1700. The slots 1710 may be sized and include a length (Z-direction) that permits portions of the clamping mechanism 1306 (e.g., body 1614), as well as the hooks 1612 to rotate from the unclamped state to the clamped state. In some instances, in the clamped state, the wheels 1502 may be lifted or disposed above the groove 1708 (or a surface of the floor 116). For example, upon transitioning to the clamped state, the clamping mechanisms 1306 may engage with the slots 1710, respectively, and lift the wheels 1502 in the Y-direction. In doing so, the carrier 1202 may be further prevented from shifting or moving during use.

To transition the carrier 1202 from the clamped state to the unclamped state, the shaft 1308 may rotate in an opposite direction to unclamp the carrier 1202. Additionally, as noted above, while FIG. 19B illustrates the hooks 1612 facing one another in the clamped state, in some instances, in the clamped state the hooks 1612 may face a similar direction or an opposite direction.

Although the discussion herein relates to the track 1700 (or the track 1204) including groove(s) (e.g., 1708), in some instances, embodiments herein may eliminate the groove(s). For example, in some instances, the floor 116 of the expandable shelter may include receivers configured to receive the clamping mechanisms 1306 of the carrier 1202, and specifically the hooks 1612, of the wheel assembly 1400. That is, while the groove(s) may assist in at least partially securing the carrier 1202 to the floor 116 (and/or the expandable shelter 100), in some instances, the floor 116 (or the expandable shelter 100), may include receivers that are similar to slots 1710 for receiving the clamping mechanisms 1306 and coupling the carrier 1202 to the expandable shelter 100.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
  a frame assembly including:
    an upper frame having a plurality of first vertical members; and
    a lower frame having a plurality of second vertical members; and
  a lift mechanism operably coupled to the frame assembly, the lift mechanism configured to transition the upper frame between a stowed state and a deployed state, the lift mechanism including:
    a plurality of vertical shafts, wherein individual vertical shafts are operably coupled between individual first vertical members of the upper frame and individual second vertical members of the lower frame;
    a plurality of screw jacks operably coupled to the individual vertical shafts; and
    a plurality of gear drives, wherein individual gear drives of the plurality of gear drives are operably coupled to individual screw jacks;
    a plurality of independent inputs, wherein each of the plurality of independent inputs is operably coupled to a respective one of the plurality of gear drives; and
    one or more horizontal shafts that operably couple the plurality of gear drives together such that the plurality of gear drives operate in unison to transition the upper frame between the stowed state and the deployed state upon actuation of any one of the plurality of independent inputs.

2. The system of claim 1, wherein the one or more shafts include:
a first side-drive shaft operably coupled to a first gear drive and a second gear drive of the plurality of gear drives;
a second side-drive shaft operably coupled a third gear drive and a fourth gear drive of the plurality of gear drives; and
a cross-drive shaft operably coupled to the first side-drive shaft and the second side-drive shaft,
wherein the first side-drive shaft, the second side-drive shaft, and the cross-drive shaft couple to the first gear drive, the second gear drive, the third gear drive, and the fourth gear drive for operation in unison.

3. The system of claim 2, wherein the plurality of independent inputs comprises:
a first input coupled to the first gear drive;
a second input coupled to the second gear drive;
a third input coupled to the third gear drive; and
a fourth input couple to the fourth gear drive,
wherein each of the first input, the second input, the third input and the fourth input are rotatable to actuate the lift mechanism.

4. The system of claim 1, wherein a rotational movement of at least one of the plurality of gear drives transfers the rotational movement to the plurality of gear drives via the one or more horizontal shafts and causes the upper frame to transition between the stowed state and the deployed state.

5. The system of claim 1, wherein the individual screw jacks of the plurality of screw jacks further include a wear plate, the wear plate disposed in or on the individual first vertical members of the plurality of first vertical members.

6. The system of claim 1, further comprising a plurality of ceiling panels coupled to the upper frame, wherein the plurality of ceiling panels are configured to transition between the stowed state and the deployed state.

7. The system of claim 1, further comprising a plurality of floor panels coupled to the lower frame, wherein the plurality of floor panels are configured to transition between the stowed state and the deployed state.

8. The system of claim 7, wherein the frame assembly includes a perimeter, and wherein the plurality of floor panels are disposed within the perimeter of the frame assembly in the stowed state.

9. An enclosure comprising:
an upper frame;
a lower frame; and
a lift mechanism operably coupling the upper frame and the lower frame, the lift mechanism transitioning the enclosure between a stowed state and a deployed state, the lift mechanism including:
a plurality of first drive shafts;
a plurality of screw jacks, wherein individual screw jacks each include a nut and a spring for resiliently biasing the nut wherein a respective nut threadedly engages with individual ones of the plurality of first drive shafts, and a stop nut secured to each individual first drive shaft of the plurality of first drive shafts;
a second drive shaft operably coupling the plurality of first drive shafts for operation in unison; and
an input operably coupled to at least one of the plurality of first drive shafts or the second drive shaft,
wherein a movement of the input transitions the upper frame away from the lower frame to at least partially transition the enclosure between the stowed state and the deployed state.

10. The enclosure of claim 9, further comprising:
a plurality of first gear drives, wherein individual first gear drives of the plurality of first gear drives operably couple to individual ones of the plurality of first drive shafts, wherein the individual first gear drives transfer the movement of the input to the individual one of the plurality of first drive shafts; and
a plurality of second gear drives, wherein individual second gear drives of the plurality of second gear drives operably couple to the individual first gear drives and the second drive shaft, wherein the individual second gear drives transfer the movement of the input to the second drive shaft.

11. The enclosure of claim 9, wherein:
the movement causes the individual ones of the plurality of first drive shafts to rotate and engage the individual screw jacks such that the enclosure transitions between the stowed state and the deployed state.

12. The enclosure of claim 9, wherein the spring comprises a spring assembly to accommodate a misalignment of one of the plurality of first drive shafts with another one of the plurality of first drive shafts.

13. The enclosure of claim 9, wherein:
the spring is positioned between the stop nut and the nut.

14. The enclosure of claim 9, wherein:
the upper frame includes one or more first posts disposed at corners of the upper frame; and
the lower frame includes one or more second posts disposed at corners of the lower frame, individual second posts of the one or more second posts being configured to be disposed over individual first posts of the one or more first posts in the stowed state or be disposed within the individual first posts of the one or more first posts in the stowed state.

15. The enclosure of claim 9, wherein the upper frame includes a top and the lower frame includes a floor, the enclosure further comprising at least one of:
a ceiling panel operably coupled to the upper frame, the ceiling panel being substantially perpendicular to the top in the stowed state and substantially parallel to the top in the deployed state; or
a floor panel operably coupled to the lower frame, the floor panel being substantially perpendicular to the floor in the stowed state and substantially parallel to the floor in the deployed state.

16. An expandable shelter configured to transition between a stowed state and a deployed state, the expandable shelter comprising:
a trailer; and
a frame assembly coupled to the trailer, the frame assembly including:
an upper frame having
a plurality of first vertical posts; and
a plurality of ceiling panels configured to unfold from the upper frame;
a lower frame having:
a plurality of second vertical posts, wherein individual second vertical posts of the plurality of second vertical posts are configured to telescopically engage with individual first vertical posts of the plurality of first vertical posts;
a plurality of floor panels configured to unfold from the lower frame when the upper frame is in the deployed state;
wherein the plurality of ceiling panels of the upper frame overlay the plurality of floor panels of the lower frame when the expandable shelter is in the stowed state;

a lifting mechanism comprising multiple linear actuators coupled to one another to operate in unison to transition the expandable shelter between the stowed state and the deployed state;

a plurality of inputs coupled to the lifting mechanism, wherein each of the plurality of inputs is coupled to a respective one of the multiple linear actuators;

wherein individual linear actuators of the lifting mechanism include:

a vertical shaft;

a screw jack operably coupled to the vertical shaft; and a gear drive coupled between the vertical shaft and the input, wherein a rotation of the vertical shaft causes the screw jack to be driven along a length of the vertical shaft to transition the expandable shelter between the stowed state and the deployed state; and a stop nut secured to the vertical shaft to retard the vertical shaft from disengaging with the screw lack;

wherein the screw jack includes a nut threadedly engaging the vertical shaft a first spring located adjacent a first side of the nut for resiliently biasing the nut; a second spring located adjacent a second side of the nut for resiliently biasing the nut; and a third spring located adjacent the stop nut.

17. The expandable shelter of claim 16 wherein the screw jack further comprises a housing, and a respective plate mounted to the housing for supporting each of the first, second, and third springs.

* * * * *